United States Patent
Liu et al.

(10) Patent No.: US 12,468,518 B2
(45) Date of Patent: Nov. 11, 2025

(54) CONTROLLING AN ANDROID APP ON A WINDOWS OPERATING SYSTEM USING AN ANDROID SIMULATOR

(71) Applicant: Huawei Technologies Co., Ltd., Shenzhen (CN)

(72) Inventors: Meng Liu, Beijing (CN); Jingxi Ma, Beijing (CN); Dan Wu, Beijing (CN); Lei Gong, Beijing (CN); Hua Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 18/557,736

(22) PCT Filed: Apr. 20, 2022

(86) PCT No.: PCT/CN2022/087920
§ 371 (c)(1),
(2) Date: Oct. 27, 2023

(87) PCT Pub. No.: WO2022/228236
PCT Pub. Date: Nov. 3, 2022

(65) Prior Publication Data
US 2024/0241708 A1    Jul. 18, 2024

(30) Foreign Application Priority Data

Apr. 29, 2021   (CN) ........................ 202110476602.4

(51) Int. Cl.
*G06F 8/61*       (2018.01)

(52) U.S. Cl.
CPC . *G06F 8/61* (2013.01); *G06F 8/62* (2013.01)

(58) Field of Classification Search
None
See application file for complete search history.

(56) References Cited

U.S. PATENT DOCUMENTS

| 2005/0166201 A1* | 7/2005 | Lai ...................... G06F 9/44573 717/174 |
| 2011/0154287 A1* | 6/2011 | Mukkamala .............. G06F 8/30 717/105 |
| 2014/0137100 A1* | 5/2014 | Won ...................... H04M 1/724 717/176 |

(Continued)

FOREIGN PATENT DOCUMENTS

| CN | 105700923 A | 6/2016 |
| CN | 106293880 A | 1/2017 |

(Continued)

*Primary Examiner* — Qing Chen
(74) *Attorney, Agent, or Firm* — Slater Matsil, LLP

(57) ABSTRACT

A method and an apparatus for controlling an Android app, and a terminal device are provided, and relate to the field of computer control technologies. According to the method, the Windows terminal device may create shortcuts for an Android app in common control areas, that is, in a start menu and settings and on a control panel and a desktop, by using an Android simulator platform. In this way, it is convenient for a user to perform an operation, for example, a viewing, starting, uninstallation, or changing operation, on the Android app at a corresponding shortcut location of the Windows terminal device.

19 Claims, 17 Drawing Sheets

(56) References Cited

U.S. PATENT DOCUMENTS

2015/0301700 A1\* 10/2015 Komori .................. G06F 9/445
                                                                             715/765
2017/0371509 A1\* 12/2017 Jung ..................... G06F 3/0482
2021/0271491 A1\* 9/2021 Li ......................... H04L 67/306

FOREIGN PATENT DOCUMENTS

| CN | 106445630 A | 2/2017 |
| --- | --- | --- |
| CN | 104740872 B | 6/2018 |
| CN | 111273948 A | 6/2020 |

\* cited by examiner (a)

(b)

(a)

(b)

CONTROLLING AN ANDROID APP ON A WINDOWS OPERATING SYSTEM USING AN ANDROID SIMULATOR

CROSS-REFERENCE TO RELATED APPLICATIONS

This application is a National Stage of International Application No. PCT/CN2022/087920 filed on Apr. 20, 2022, which claims priority to Chinese Patent Application No. 202110476602.4, filed on Apr. 29, 2021, both of which are hereby incorporated by reference in their entireties.

TECHNICAL FIELD

This application relates to the field of computer control technologies, and in particular, to a method and an apparatus for controlling an Android app, and a terminal device.

BACKGROUND

With further integration of personal computers (personal computers, PCs) and mobile phones, Windows systems of PC products gradually use applications (applications, apps) of Android (Android) systems of mobile phone products by using simulator virtualization technologies. Users can use Android apps on the Windows by using simulator software.

Currently, for use of an Android app on a PC, a simulator usually needs to be installed on the PC, so that a user can perform a series of operations on the simulator to trigger downloading, starting, or uninstallation of the Android app. Specifically, if the user needs to start an Android app on the PC, the user first needs to find simulator software on the PC and trigger the simulator to start. In this way, a main window of the simulator is displayed on a desktop of the PC. Then, the user needs to find an icon of the Android app in the main window of the simulator, and perform an operation on the icon of the Android app to trigger the Android app to start and run. In addition, if the main window of the simulator does not have an Android app needed by the user, the user needs to find an application market app in the main window of the simulator, trigger the application market to start, and download and install the Android app through the application market. After the installation is completed, an icon of the installed Android app is displayed in the main window of the simulator, to be used for the user. In this way, the Android app is installed. Moreover, if the user needs to uninstall an Android app on the PC, the user still needs to trigger the simulator to start, find an icon of the Android app in the main window of the simulator, and perform an uninstallation operation on the icon of the Android app. In this way, the Android app is uninstalled.

In the foregoing process of using the Android app on the PC, a series of operations needs to be performed in the main window of the simulator to download, start, or uninstall the Android app. Consequently, operations are complex and user experience is affected.

SUMMARY

This application provides a method and an apparatus for controlling an Android app, and a terminal device, so that an Android app can be conveniently controlled on a Windows operating system, and the Android app does not need to be installed, started, or uninstalled by performing operations in a main window of a simulator, to improve user experience.

To achieve the foregoing objective, the following technical solutions are used in this application.

According to a first aspect, this application provides a method for controlling an Android app on a Windows operating system, where the method is applied to a terminal device running the Windows operating system, and the method includes:

an Android simulator installs, starts, or uninstalls a target Android app in response to an installation, starting, or uninstallation operation performed by a user on the target Android app on the terminal device, where the target Android app is an application applicable to an Android operating system; and when the Android simulator installs the target Android app, displaying a shortcut icon of the target Android app on the terminal device; or when the Android simulator starts the target Android app, displaying a running interface of the target Android app on a desktop of the terminal device; or when the Android simulator uninstalls the target Android app, deleting a shortcut icon of the target Android app from the terminal device.

According to this solution in this application, the Windows terminal device creates a shortcut for the Android app in a common control area by using an Android simulator platform, so that the Android app can be conveniently controlled (for example, downloaded, started, uninstalled, or changed) on the Windows operating system. This is the same as a manner of performing an operation on Windows software on the Windows operating system, and conforms to a conventional operation habit of the Windows user. The user does not need to manually trigger the simulator to start, and does not need to perform an operation in a main window of the simulator to use the Android app. Therefore, this solution can improve user experience.

In a possible implementation of the first aspect, the installing, starting, or uninstalling, by an Android simulator, a target Android app in response to an installation, starting, or uninstallation operation performed by a user on the target Android app on the terminal device includes:

in response to the installation, starting, or uninstallation operation performed by the user on the target Android app on the terminal device, starting the Android simulator in a background of the terminal device, and installing, starting, or uninstalling, by the Android simulator, the target Android app.

According to this solution in this application, from a perspective of use experience of the user, because the simulator runs in the background and is not displayed in a foreground (that is, the desktop of the Windows operating system), the user is unaware of the simulator, and intuitively feels that the Android app is directly controlled on the Windows operating system. This conforms to the conventional operation habit of the Windows user, thereby improving user experience.

In a possible implementation of the first aspect, the displaying a shortcut icon of the target Android app on the terminal device includes:

the Android simulator invokes a first application programming interface API of the Windows operating system, to create a shortcut of the target Android app on the terminal device, and trigger display of the shortcut icon of the target Android app on the terminal device.

In a possible implementation of the first aspect, the displaying a shortcut icon of the target Android app on the terminal device includes:

displaying the shortcut icon of the target Android app in a start menu of the terminal device; and/or displaying the shortcut icon of the target Android app on an uninstall or change program interface on a control panel of the terminal device; and/or displaying the shortcut icon of the target Android app on the desktop of the terminal device; and/or displaying the shortcut icon of the target Android app on an application function interface in settings of the terminal device.

According to this solution, the Windows terminal device may create shortcuts for the Android app in common control areas, that is, in the start menu and the settings and on the control panel and the desktop, by using the Android simulator platform. In this way, it is convenient for the user to perform an operation, for example, a viewing, starting, uninstallation, or changing operation, on the Android app at a corresponding shortcut location of the Windows terminal device.

In a possible implementation of the first aspect, a file name corresponding to the shortcut icon includes a preset character and an application name of the target Android app, and the preset character may be a blank character or an invisible character.

In a possible implementation of the first aspect, the method further includes:

in response to the triggered installation operation performed by the user on the target Android app on the terminal device, downloading a first installation package of the target Android app; and storing the first installation package of the target Android app in a shared path in the terminal device.

In a possible implementation of the first aspect, the downloading a first installation package of the target Android app includes: downloading the first installation package of the target Android app from an application market; and in response to the triggered installation operation performed by the user on the target Android app on the terminal device includes: in response to a triggered installation operation performed by the user on an installation control that is corresponding to the target Android app and that is in the application market.

In a possible implementation of the first aspect, if the application market is an exe file and is installed on the terminal device, when the exe file is launched, a running interface of the application market is presented on the terminal device; or if the application market is an exe file and is associatively installed in an application market apk in the Android simulator, when the terminal device receives an instruction of the user for running the exe file, the application market apk in the Android simulator is launched, and a running interface of the application market is displayed on the terminal device.

In a possible implementation of the first aspect, that an Android simulator installs a target Android app includes:

the application market sends application name information and installation package storage path information of the target Android app to the Android simulator through interprocess communication;

the Android simulator obtains the first installation package of the target Android app based on the application name information of the target Android app and the shared path that is indicated by the installation package storage path information of the target Android app; and the Android simulator loads the first installation package of the target Android app by using the Android system, to install the target Android app.

In a possible implementation of the first aspect, the method further includes:

when the Android simulator installs the target Android app, the Android simulator obtains application information of the target Android app, where the application information of the target Android app includes a package name, an application icon, the application name, version information, landscape/portrait orientation information, installation time, and/or a name identifier that are/is corresponding to the target Android app; and the Android simulator generates, on the terminal device based on the application information of the target Android app, a second installation package associated with the shortcut icon of the target Android app, where the second installation package includes the application name, application configuration information, a driver used to start the target Android app, and a driver used to uninstall/update the target Android app that are corresponding to the target Android app.

In a possible implementation of the first aspect, after the target Android app is installed, the method further includes:

the Android simulator sends a first response message to the application market through interprocess communication, where the first response message includes a package name of the target Android app and a result indicating that the target Android app has been installed; and the application market updates, based on the first response message, the installation control that is corresponding to the target Android app and that is in the application market to a start control for display.

In a possible implementation of the first aspect, that an Android simulator starts a target Android app in response to a starting operation performed by a user on the target Android app on the terminal device includes:

in response to a starting operation performed by the user on the shortcut icon of the target Android app, the terminal device invokes a driver that is used to start the target Android app and that is in the second installation package associated with the shortcut icon of the target Android app, to trigger the Android simulator to enable an app starting function, reads the package name of the target Android app from the application configuration information of the second installation package, and sends the package name of the target Android app to the Android simulator; and the Android simulator searches the Android simulator to find the target Android app based on the package name of the target Android app, draws, on the terminal device, a first window corresponding to the target Android app, starts the target Android app by using the Android system, and places the running interface of the target Android app into the first window.

In a possible implementation of the first aspect, that an Android simulator uninstalls a target Android app in response to an uninstallation operation performed by a user on the target Android app on the terminal device includes:

in response to an uninstallation operation performed by the user on the shortcut icon of the target Android app on the terminal device, the terminal device invokes a driver that is used to uninstall the target Android app and that is in the second installation package corresponding to the target Android app, to trigger the Android simulator to enable an app uninstallation function, reads the package name of the target Android app from the application configuration information of the second installation package, and sends the package name of the target Android app to the Android simulator; and the Android simulator searches the Android simulator to find the target Android app based on the package name of the target Android app, and uninstalls the target Android app by using the Android system.

In a possible implementation of the first aspect, the deleting a shortcut icon of the target Android app from the terminal device includes:

the Android simulator invokes a second API of the Windows operating system, to delete, from the terminal device, the shortcut icon and the second installation package of the target Android app.

In a possible implementation of the first aspect, after the target Android app is uninstalled, the method further includes:

the Android simulator sends a second response message to the application market on the terminal device through interprocess communication, where the second response message includes the package name of the target Android app and a result indicating that the target Android app has been uninstalled; and the application market updates, based on the second response message, the start control corresponding to the target Android app to the installation control for display.

According to a second aspect, this application provides a method for controlling an Android app, where the method is applied to an Android simulator, and the method includes:

the Android simulator installs, starts, or uninstalls a target Android app according to a first instruction, where the first instruction is triggered when a user performs an installation operation, a starting operation, or an uninstallation operation on the target Android app on a terminal device running a Windows operating system, and the target Android app is an application applicable to an Android operating system; and when the Android simulator installs the target Android app, the Android simulator creates a shortcut of the target Android app on the terminal device; or when the Android simulator starts the target Android app, the Android simulator displays a running interface of the target Android app on a desktop of the terminal device; or when the Android simulator uninstalls the target Android app, the Android simulator deletes a shortcut of the target Android app from the terminal device.

According to this solution in this application, the Android simulator may create the shortcut for the Android app in a common control area of the Windows terminal device, so that the Android app can be conveniently controlled (for example, downloaded, started, uninstalled, or changed) on the Windows operating system. This is the same as a manner of performing an operation on Windows software on the Windows operating system, and conforms to a conventional operation habit of the Windows user. The user does not need to manually trigger the simulator to start, and does not need to perform an operation in a main window of the simulator to use the Android app. Therefore, this solution can improve user experience.

In a possible implementation of the second aspect, that the Android simulator installs, starts, or uninstalls a target Android app according to a first instruction includes:

in response to the first instruction, the Android simulator starts in a background; and the Android simulator installs, starts or uninstalls the target Android app according to the first instruction.

In a possible implementation of the second aspect, that the Android simulator creates a shortcut of the target Android app on the terminal device includes:

the Android simulator invokes a first application programming interface API of the Windows operating system, to create the shortcut of the target Android app on the terminal device, and trigger display of a shortcut icon of the target Android app on the terminal device.

In a possible implementation of the second aspect, that the Android simulator creates a shortcut of the target Android app on the terminal device includes:

the Android simulator creates the shortcut of the target Android app in a start menu of the terminal device; and/or the Android simulator creates the shortcut of the target Android app on an uninstall or change program interface on a control panel of the terminal device; and/or the Android simulator creates the shortcut of the target Android app on the desktop of the terminal device; and/or the Android simulator creates the shortcut of the target Android app on an application function interface in settings of the terminal device.

In a possible implementation of the second aspect, a file name corresponding to the shortcut icon includes a preset character and an application name of the target Android app, and the preset character may be a blank character or an invisible character.

In a possible implementation of the second aspect, the first instruction is triggered when the user performs an installation operation on the target Android app by using an application market installed on the terminal device; and that the Android simulator installs a target Android app according to a first instruction includes:

the Android simulator receives, through interprocess communication, the first instruction sent by the application market, where the first instruction includes application name information and installation package storage path information of the target Android app;

the Android simulator obtains a first installation package of the target Android app based on the application name information of the target Android app and a shared path that is indicated by the installation package storage path information of the target Android app; and the Android simulator loads the first installation package of the target Android app by using the Android system, to install the target Android app.

In a possible implementation of the second aspect, the method further includes:

when the Android simulator installs the target Android app, the Android simulator obtains application information of the target Android app, where the application information of the target Android app includes a package name, an application icon, the application name, version information, landscape/portrait orientation information, installation time, and/or a name identifier that are/is corresponding to the target Android app; and the Android simulator generates, on the terminal device based on the application information of the target Android app, a second installation package associated with the shortcut icon of the target Android app, where the second installation package includes the application name, application configuration information, a driver used to start the target Android app, and a driver used to uninstall/update the target Android app that are corresponding to the target Android app.

In a possible implementation of the second aspect, after the Android simulator installs the target Android app according to the first instruction, the method further includes:

the Android simulator sends a first response message to the application market on the terminal device through interprocess communication, where the first response message includes the package name of the target Android app and a result indicating that the target Android app has been installed.

In a possible implementation of the second aspect, the first instruction is triggered when the user performs a starting operation on the shortcut icon of the target Android app on the terminal device, or is triggered when the user performs a starting operation on a start control that is corresponding to the target Android app and that is in the application market on the terminal device;

that the Android simulator starts a target Android app according to a first instruction includes: when the Android simulator has installed the target Android app, in response to the first instruction, the Android simulator invokes a driver that is used to start the target Android app and that is in the second installation package associated with the shortcut icon of the target Android app, to trigger the Android system to start the target Android app; and that the Android simulator displays a running interface of the target Android app on a desktop of the terminal device includes: the Android simulator draws a first window for the target Android app on the desktop of the terminal device, and adds the running interface of the target Android app to the first window by using the Android system.

In a possible implementation of the second aspect, that the Android simulator draws a first window for the target Android app on the desktop of the terminal device includes:

the Android simulator draws the first window on the desktop of the terminal device based on the landscape/portrait orientation information corresponding to the target Android app.

In a possible implementation of the second aspect, when the landscape/portrait orientation information indicates a landscape orientation, a horizontal size of the first window drawn by the Android simulator is greater than a vertical size of the first window; or when the landscape/portrait orientation information indicates a portrait orientation, a vertical size of the first window drawn by the Android simulator is greater than a horizontal size of the first window.

In a possible implementation of the second aspect, the first instruction is triggered when the user performs an uninstallation operation on the shortcut icon of the target Android app on the terminal device; and that the Android simulator uninstalls a target Android app according to a first instruction includes: the Android simulator invokes, according to the first instruction, a driver that is used to uninstall the target Android app and that is in the second installation package corresponding to the target Android app, reads the package name of the target Android app from the application configuration information of the second installation package, searches to find the target Android app based on the package name of the target Android app, and uninstalls the target Android app by using the Android system.

In a possible implementation of the second aspect, after the target Android app is uninstalled, the method further includes:

the Android simulator sends a second response message to the application market on the terminal device through interprocess communication, where the second response message includes the package name of the target Android app and a result indicating that the target Android app has been uninstalled.

According to a third aspect, this application provides an apparatus for controlling an Android app, where the apparatus includes units configured to perform the method in the first aspect. The apparatus may correspondingly perform the method described in the first aspect. For related descriptions of the units in the apparatus, reference is made to the descriptions in the first aspect. For brevity, details are not described herein again.

According to a fourth aspect, this application provides an apparatus for controlling an Android app, where the apparatus includes units configured to perform the method in the second aspect. The apparatus may correspondingly perform the method described in the second aspect. For related descriptions of the units in the apparatus, reference is made to the descriptions in the second aspect. For brevity, details are not described herein again.

The method described in the first aspect or the method described in the second aspect may be implemented by using hardware, or may be implemented by hardware executing corresponding software. The hardware or the software includes one or more modules or units corresponding to the foregoing functions, for example, a processing module or unit.

According to a fifth aspect, this application provides a terminal device. The terminal device includes a processor, and the processor is coupled to a memory. The memory is configured to store a computer program or instructions, and the processor is configured to execute the computer program or instructions stored in the memory, so that the method in the first aspect is performed. For example, the processor is configured to execute the computer program or instructions stored in the memory, so that the apparatus performs the method in the first aspect.

According to a sixth aspect, this application provides a terminal device. The terminal device includes a processor, and the processor is coupled to a memory. The memory is configured to store a computer program or instructions, and the processor is configured to execute the computer program or instructions stored in the memory, so that the method in the second aspect is performed. For example, the processor is configured to execute the computer program or instructions stored in the memory, so that the apparatus performs the method in the second aspect.

According to a seventh aspect, this application provides a computer-readable storage medium. The computer-readable storage medium stores a computer program (which may also be referred to as instructions or code) used to implement the method in the first aspect. For example, when the computer program is executed by a computer, the computer is enabled to perform the method in the first aspect.

According to an eighth aspect, this application provides a computer-readable storage medium. The computer-readable storage medium stores a computer program (which may also be referred to as instructions or code) used to implement the method in the second aspect. For example, when the computer program is executed by a computer, the computer is enabled to perform the method in the second aspect.

According to a ninth aspect, this application provides a chip, including a processor. The processor is configured to read and execute a computer program stored in a memory, to perform the method in any one of the first aspect or the possible implementations of the first aspect. Optionally, the chip further includes the memory, and the memory is connected to the processor through a circuit or a wire.

According to a tenth aspect, this application provides a chip, including a processor. The processor is configured to read and execute a computer program stored in a memory, to perform the method in any one of the second aspect or the possible implementations of the second aspect. Optionally, the chip further includes the memory, and the memory is connected to the processor through a circuit or a wire.

According to an eleventh aspect, this application provides a computer program product. The computer program product includes a computer program (or may be referred to as instructions or code). When the computer program is executed by a computer, the computer is enabled to implement the method in the first aspect.

According to a twelfth aspect, this application provides a computer program product. The computer program product includes a computer program (or may be referred to as instructions or code). When the computer program is executed by a computer, the computer is enabled to implement the method in the second aspect.

It can be understood that, for beneficial effects of the third aspect to the twelfth aspect, reference may be made to related descriptions in the first aspect or the second aspect. Details are not described herein again.

DETAILED DESCRIPTION OF ILLUSTRATIVE EMBODIMENTS

To make the objectives, technical solutions, and advantages of embodiments of this application clearer, the following clearly and completely describes technical solutions in embodiments of this application with reference to the accompanying drawings in embodiments of this application. It is clear that the described embodiments are some but not all embodiments of this application. All other embodiments obtained by a person of ordinary skill in the art based on embodiments of this application without creative efforts shall fall within the protection scope of this application.

A term "and/or" in this specification describes an association relationship for describing associated objects and represents that three relationships may exist. For example, A and/or B may represent the following three cases: Only A exists, both A and B exist, and only B exists. A character "/" in this specification indicates an "or" relationship between associated objects. For example, A/B indicates A or B.

In the specification and claims of this application, terms "first", "second", and the like are intended to distinguish between different objects but do not indicate a particular order of the objects. For example, a first response message and a second response message are used to distinguish between different response messages, but are not used to indicate a particular order of the response messages.

In embodiments of this application, a term "example", "for example", or the like is used to represent giving an example, an illustration, or a description. Any embodiment or design scheme described as "example" or "for example" in embodiments of this application should not be construed as being preferred or having more advantages over other embodiments or design schemes. Exactly, use of the term "example", "for example", or the like is intended to present a related concept in a specific manner.

In descriptions of embodiments of this application, unless otherwise specified, "a plurality of" means at least two. For example, a plurality of processing units means at least two processing units, and a plurality of elements means at least two elements.

Figure 1:
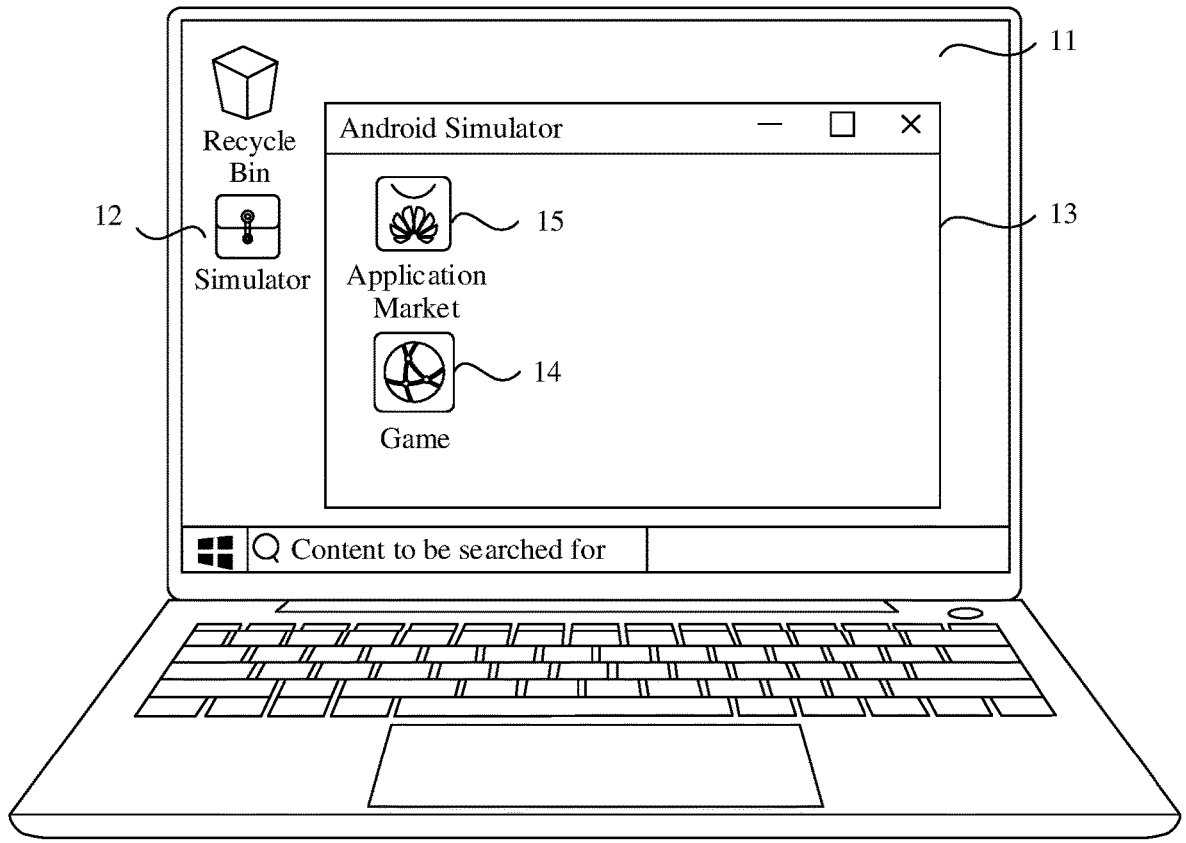
FIG. 1 is a schematic diagram of an interface for using an Android app on a PC in the conventional technology.

An Android simulator is software that can run on a PC and simulate an Android system, and install, run, and uninstall Android apps. After the simulator is installed on the PC, a user may perform an operation in a main window of the simulator to trigger downloading, starting, or uninstallation of the Android apps. In this way, the Android apps can be used on the PC. With reference to FIG. 1, the following uses an example to describe a process of using an Android app on a PC running a Windows operating system in an existing technical solution.

As shown in FIG. 1, for startup of an Android app on the PC, simulator software 12 first needs to be found on a desktop 11 of the PC and the simulator 12 needs to be triggered to start. In this way, a main window 13 of the simulator is displayed on the desktop 11 of the PC. Then, an icon of the Android app (for example, a game app 14) needs to be found in the main window 13 of the simulator, and an operation is performed on the icon of the Android app to trigger the Android app to start and run.

Still with reference to FIG. 1, if the main window 13 of the simulator does not have an Android app needed by a user, an application market 15 needs to be found in the main window 13 of the simulator, the application market needs to be triggered to start, and the Android app needs to be downloaded and installed through the application market. After the installation is completed, an icon of the installed Android app is displayed in the main window 13 of the simulator, to be used for the user.

Still with reference to FIG. 1, if an Android app needs to be uninstalled on the PC, the simulator 12 still needs to be triggered to start, an icon of the Android app, for example, the game app icon 14, needs to be found in the main window 13 of the simulator, and an uninstallation operation needs to be performed on the icon 14 of the Android app. For example, after the user taps the icon of the Android app, an uninstallation option is triggered to display, and then the user taps the uninstallation option to trigger uninstallation.

It can be learned that, based on the existing technical solution in which an Android app is used on the PC running the Windows operating system by using the Android simulator, operations for using (installing, starting, and uninstalling) the Android app on the PC running the Windows operating system can be implemented only in the main window of the Android simulator, and steps are complex. In addition, the operations for using the Android app on the PC running the Windows operating system are different from operations on a Windows application, and do not conform to a conventional operation habit of the Windows user, thereby affecting user experience.

In view of this, this application provides a method and an apparatus for controlling an Android app on a Windows operating system, and a terminal device. According to solutions in this application, a manner of performing an operation on an Android app on the Windows operating system is the same as a manner of performing an operation on Windows software on the Windows operating system. A user does not need to manually trigger a simulator to start, and does not need to perform an operation in a main window of the simulator to use the Android app. In this way, from a perspective of use experience of the user, because the simulator runs in a background and is not displayed in a foreground (that is, a desktop of the Windows operating system), the user is unaware of the simulator, and intuitively feels that the Android app is directly controlled on the Windows operating system. This conforms to a conventional operation habit of the Windows user, thereby improving user experience.

It should be noted that the terminal device in embodiments of this application may be a terminal device having a Windows operating system. During actual implementation, the method provided in embodiments of this application may be further applied to a terminal device having another operating system (for example, an iOS operating system). This is not specifically limited in embodiments of this application. For ease of description, the following uses the Windows operating system as an example to describe the method for controlling an Android app provided in this application.

In addition, for ease of description, in the following, the terminal device running the Windows operating system is referred to as a Windows terminal device, an app applicable to an Android operating system is referred to as an Android app, and an app applicable to the Windows operating system is referred to as a Windows app.

In embodiments of this application, a developer may develop, based on a system architecture of the Windows operating system, a software program for implementing the method for controlling an Android app provided in embodiments of this application, so that the method for controlling an Android app can run based on the Windows operating system. In other words, the terminal device or a processor may run the software program on the Windows operating system to implement the method for controlling an Android app provided in embodiments of this application.

It should also be noted that the method for controlling an Android app on the Windows operating system provided in embodiments of this application may be applicable to various existing Android simulators, and in the solutions in this application, a mobile application engine is installed on the Windows terminal device to implement corresponding functions.

Optionally, the Windows terminal device in embodiments of this application may be a mobile terminal, or may be a non-mobile terminal. For example, the mobile terminal may be a tablet computer, a notebook computer, a palmtop computer, or a vehicle-mounted terminal, and the non-mobile terminal may be a personal computer (personal computer, PC), a television (television, TV), a teller machine, or a self-service machine. This is not specifically limited in embodiments of this application.

The method for controlling an Android app provided in embodiments of this application may be performed by the foregoing Windows terminal device (for example, a PC), or may be performed by a functional module and/or a functional entity that can implement the method for controlling an Android app and that is in the terminal device. This may be specifically determined depending on an actual use requirement, and is not limited in embodiments of this application. The following uses the Windows terminal device as an example to describe, with reference to the accompanying drawings, the method for controlling an Android app provided in embodiments of this application.

First, the method for controlling an Android app provided in embodiments of this application may be applied to a Windows terminal device, and software of an Android simulator is installed on the Windows terminal device. Android apps can be installed, started, and uninstalled on the Windows terminal device by the Android simulator. According to the solutions in this application, when an Android app is downloaded by the Android simulator, corresponding app shortcuts (that is, shortcut entries) may be added to and displayed in common control areas of the Windows terminal device, and the Android app may be further conveniently and quickly started or uninstalled by using these app shortcuts on the Windows terminal device. In comparison with the conventional technology, in the solutions in this application, in a process of controlling installation, starting, and/or uninstallation of an Android app on the Windows terminal device, a main window of the Android simulator does not need to be displayed on the terminal device, and the user does not need to perform an operation in the main window of the Android simulator. According to the solutions in this application, the manner in which the user may perform an operation on an Android app on the Windows operating system is the same as the manner in which the user may perform an operation on the Windows software on the Windows operating system, and conforms to the conventional operation habit of the Windows user.

With reference to the accompanying drawings, the following details specific implementations of installing, starting, and uninstalling an Android app by using the solutions in embodiments of this application.

Figure 2:
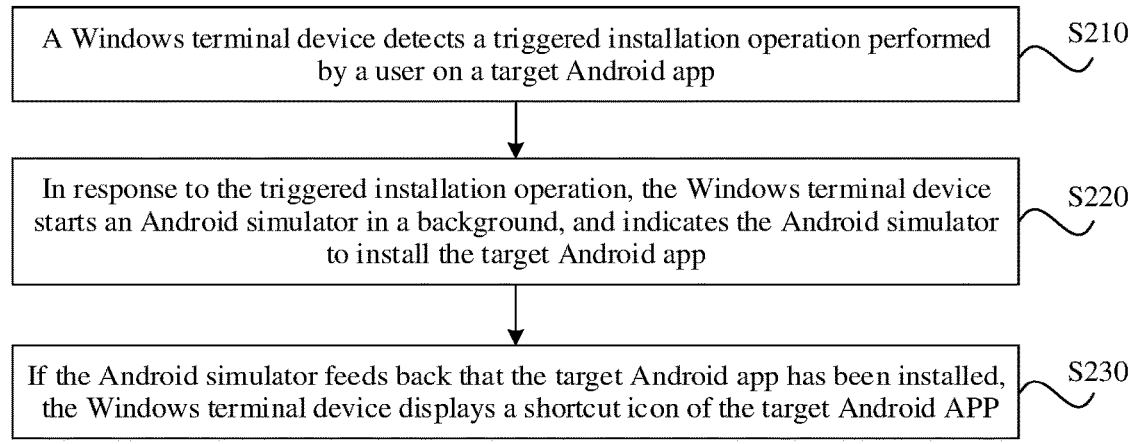
FIG. 2 is a schematic flowchart 1 of a method for controlling installation of an Android app according to an embodiment of this application.

FIG. 2 is a schematic flowchart of a method for controlling an Android app according to an embodiment of this application. The control method is applied to a process of controlling installation of an Android app on a Windows terminal device. With reference to FIG. 2, the method for controlling an Android app includes the following steps S210 to S230.

S210: The Windows terminal device detects a triggered installation operation performed by a user on a target Android app.

The target Android app is an application applicable to an Android operating system, that is, an application that can run with support of the Android operating system.

In some embodiments, software such as an Android application market (or referred to as an application store or AppGallery) may be installed on the Windows terminal device. The application market may provide an installation package used to install the target Android app, and an installation control corresponding to the target Android app may be displayed on an interface of the application market. In this case, when the user taps the installation control corresponding to the target Android app on the interface of the Android application market to trigger installation, the Windows terminal device may detect the triggered installation operation performed by the user on the target Android app.

In a possible embodiment, the Android application market of the Windows terminal device may be an exe file and is installed on the Windows terminal device. When the exe file is launched, a running interface of the Android application market on the terminal device can be presented without a need to launch a simulator application.

In another possible embodiment, the Android application market of the Windows terminal device may be an exe file, and the exe file is associatively installed in an Android application market apk in a simulator application. When the terminal device receives an instruction of the user for running the exe file, the Android application market apk in the simulator application is launched, and a running interface of the Android application market is displayed on the Windows terminal device.

When installation of the target Android app is triggered by using an entry of the application market, the Windows terminal device usually first downloads (that is, obtains) the installation package of the target Android app from the application market correspondingly, and stores the installation package of the target Android app in a shared path of the Windows terminal device.

In some other embodiments, if the user taps a download control corresponding to the target Android app on a web page of the Windows terminal device, the Windows terminal device may download (that is, obtain) the installation package of the target Android app in response to the user operation, and store the installation package in a shared path of the Windows terminal device. Further, if the user taps the downloaded installation package of the target Android app to trigger installation, the Windows terminal device may detect the triggered installation operation performed by the user on the target Android app.

It can be understood that during actual implementation, a manner in which the Windows terminal device obtains the installation package of the target Android app is not limited to the manners described above. For example, alternatively, the obtaining manner may be a file copying manner, a wireless transmission manner, or any other possible implementation. This may be specifically determined depending on an actual use requirement, and is not limited in embodiments of this application.

S220: In response to the triggered installation operation, the Windows terminal device starts the Android simulator in a background, and indicates the Android simulator to install the target Android app.

In response to the triggered installation operation, the Windows terminal device may start and run the Android simulator in the background of the Windows terminal device. In this case, a main window of the Android simulator is not displayed on a desktop of the Windows terminal device, and a process of installing the target Android app by the Android simulator is also automatically run in the background of the Windows terminal device.

In this way, from a perspective of use experience of the user, a process of installing an Android app on the Windows terminal device is similar to a process of installing a Windows app on the Windows terminal device, so that an operation for installing an Android app on the Windows terminal device is more convenient.

S230: If the Android simulator feeds back that the target Android app has been installed, the Windows terminal device displays a shortcut icon of the target Android app.

In some embodiments, when the Android simulator has installed the target Android app, the Android simulator may invoke an application programming interface (application programming interface, API) that is of a Windows operating system and that is used to install the Android app, to create a shortcut of the target Android app on the Windows terminal device, and trigger the Windows terminal device to add and display the shortcut icon of the target Android app on the terminal device.

Optionally, in an embodiment of this application, the creating a shortcut of the target Android app on the Windows terminal device may be implemented in at least one of the following possible implementations:

Manner 1: The Windows terminal device may add and display a shortcut icon of a target Android app in a start menu, where the shortcut icon may include an application icon and an application name of the Android app.

The shortcut icon of the Android app is added to the start menu of the Windows terminal device, to add a shortcut entry of the Android app to the Windows terminal device for the user, so that the user can search to find and use the Android app.

Figure 3:
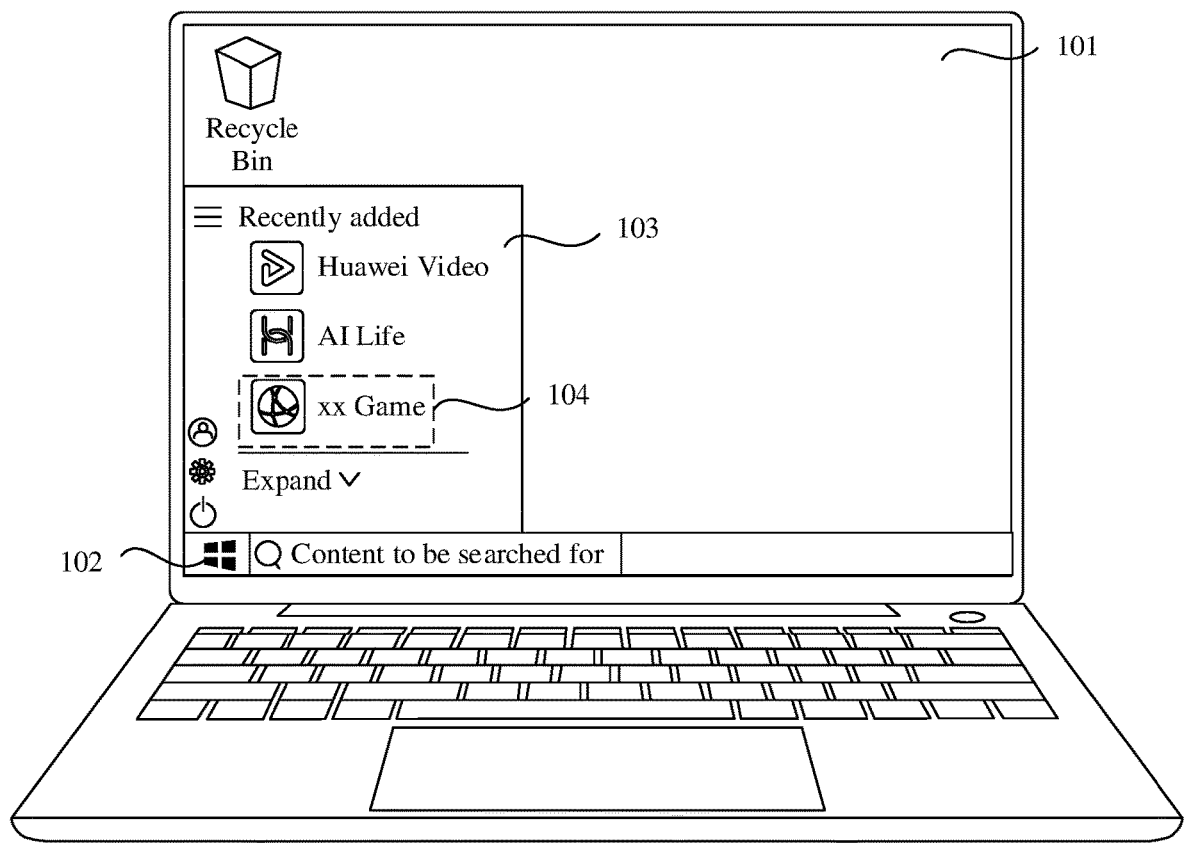
FIG. 3 is a schematic diagram 1 of an interface for applying a method for controlling installation of an Android app to a PC according to an embodiment of this application.

According to this solution, the user may perform related operations on the Android app on the Windows terminal device in a similar way to a conventional operation performed on the Windows terminal device, to search for the Android app. During actual implementation, as shown in FIG. 3, the user may enable a "Start" control 102 on a desktop 101 of the Windows terminal device, and trigger display of a start menu 103 (or referred to as a start menu bar), to directly search the start menu for a shortcut icon 104 of an installed Android app. In this way, searching for the Android app on the Windows terminal device conforms to a conventional operation habit of the Windows user, thereby improving user experience.

In addition, according to this solution, the user may perform an operation in the start menu bar, for example, tap the shortcut icon of the Android app in the start menu bar, to trigger the Android app to start and run. In this way, starting of the Android app can be quickly triggered. The user may also perform an operation in the start menu bar, for example, tap an app uninstallation option in the start menu bar, to trigger redirection to a corresponding uninstallation interface. In this way, uninstallation of the Android app can be quickly triggered.

In this embodiment of this application, the Android app is managed by using the Windows start menu, so that a problem of complex management of the Android app by using the Android simulator is resolved, and operations of the user for using the Android app on the Windows operating system are simplified.

Figure 4:
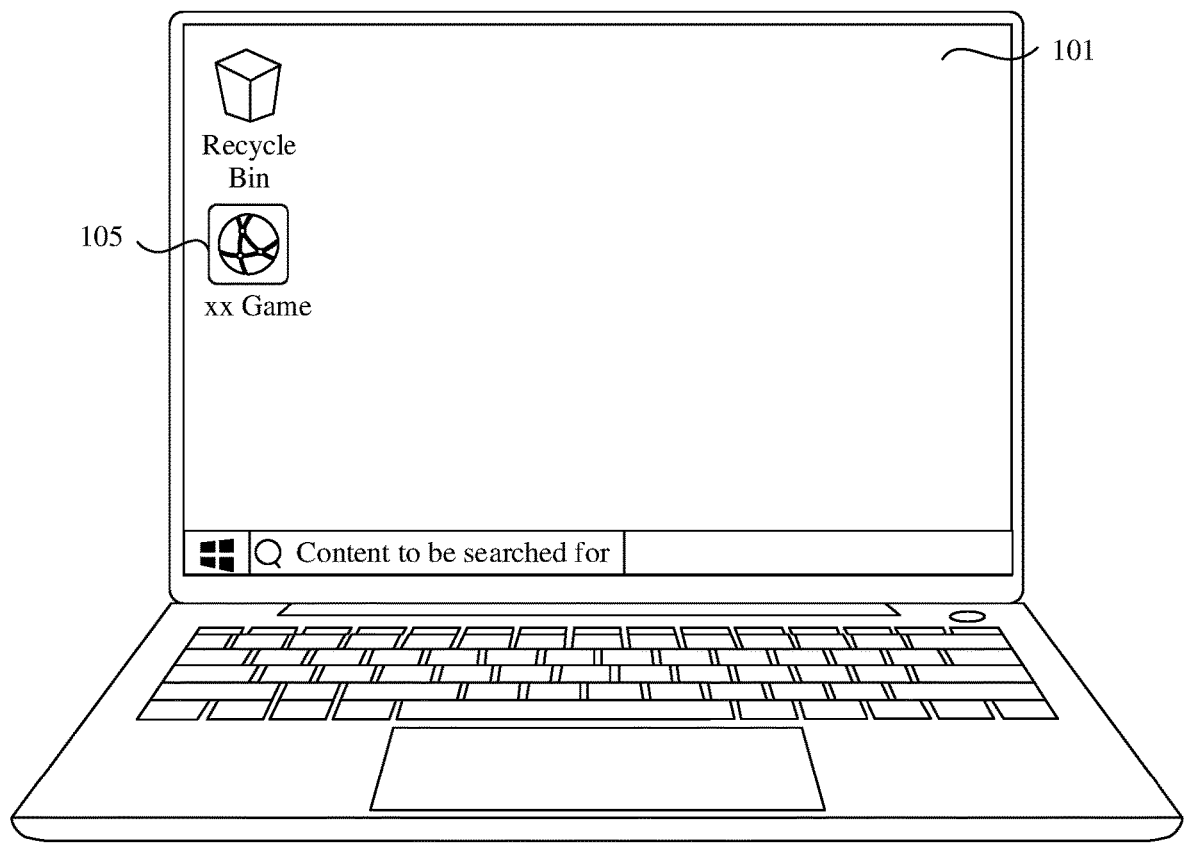
FIG. 4 is a schematic diagram 2 of an interface for applying a method for controlling installation of an Android app to a PC according to an embodiment of this application.

Manner 2: As shown in FIG. 4, the Windows terminal device may add and display a shortcut icon 105 of a target Android app on a desktop 101, where the shortcut icon may include an application icon and an application name of the Android app.

Figure 5:
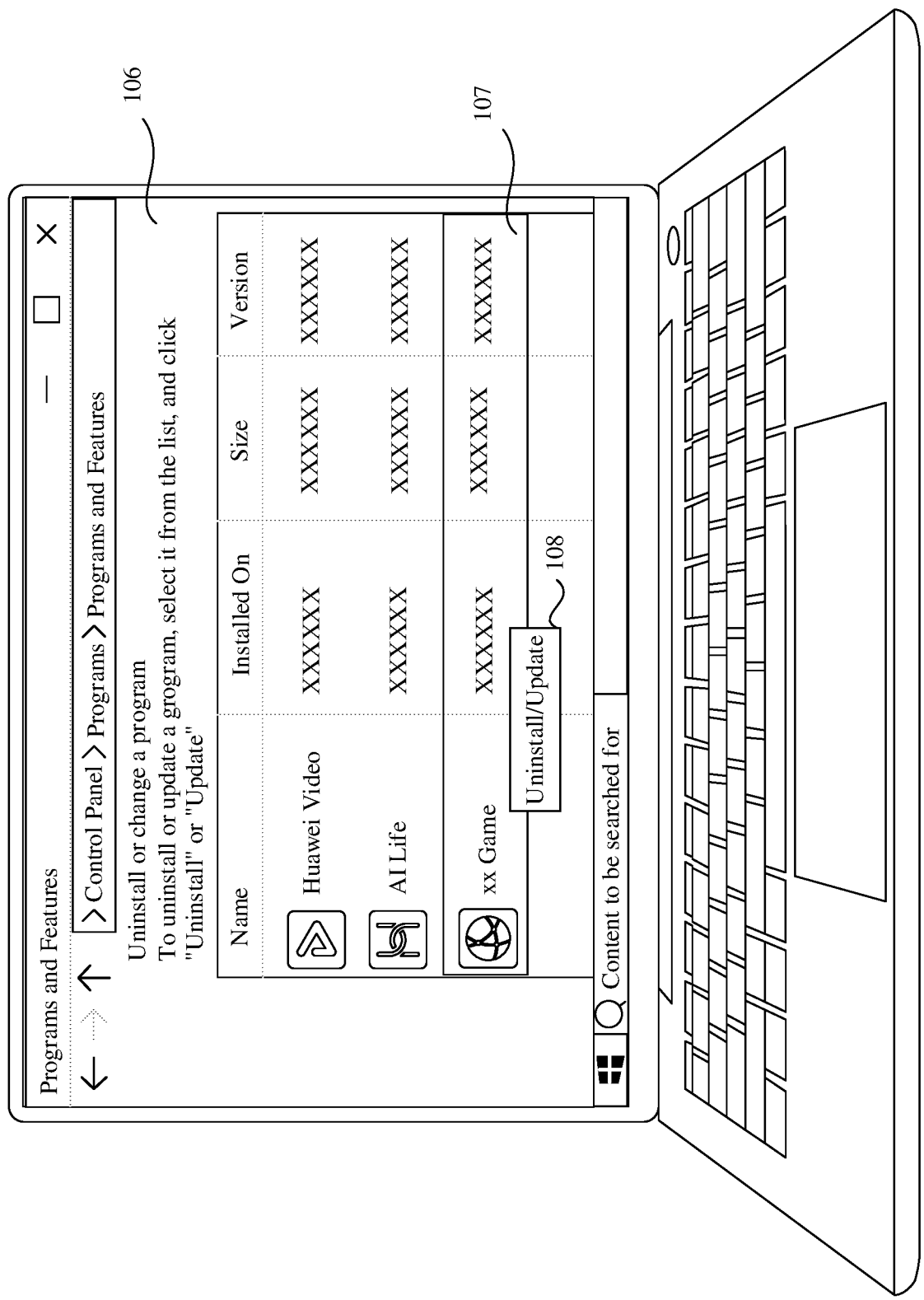
FIG. 5 is a schematic diagram 3 of an interface for applying a method for controlling installation of an Android app to a PC according to an embodiment of this application.

Manner 3: As shown in FIG. 5, the Windows terminal device may add and display a shortcut icon 107 of a target Android app on an uninstall/change program interface 106 on a control panel, where the shortcut icon may include an application icon and an application name of the Android app.

If the user taps the selected shortcut icon 107, an "Uninstall/Change" control 108 is displayed. The user may perform an operation on the "Uninstall/Change" control 108 to trigger uninstallation, change, or repair of the selected Android app.

Figure 6:
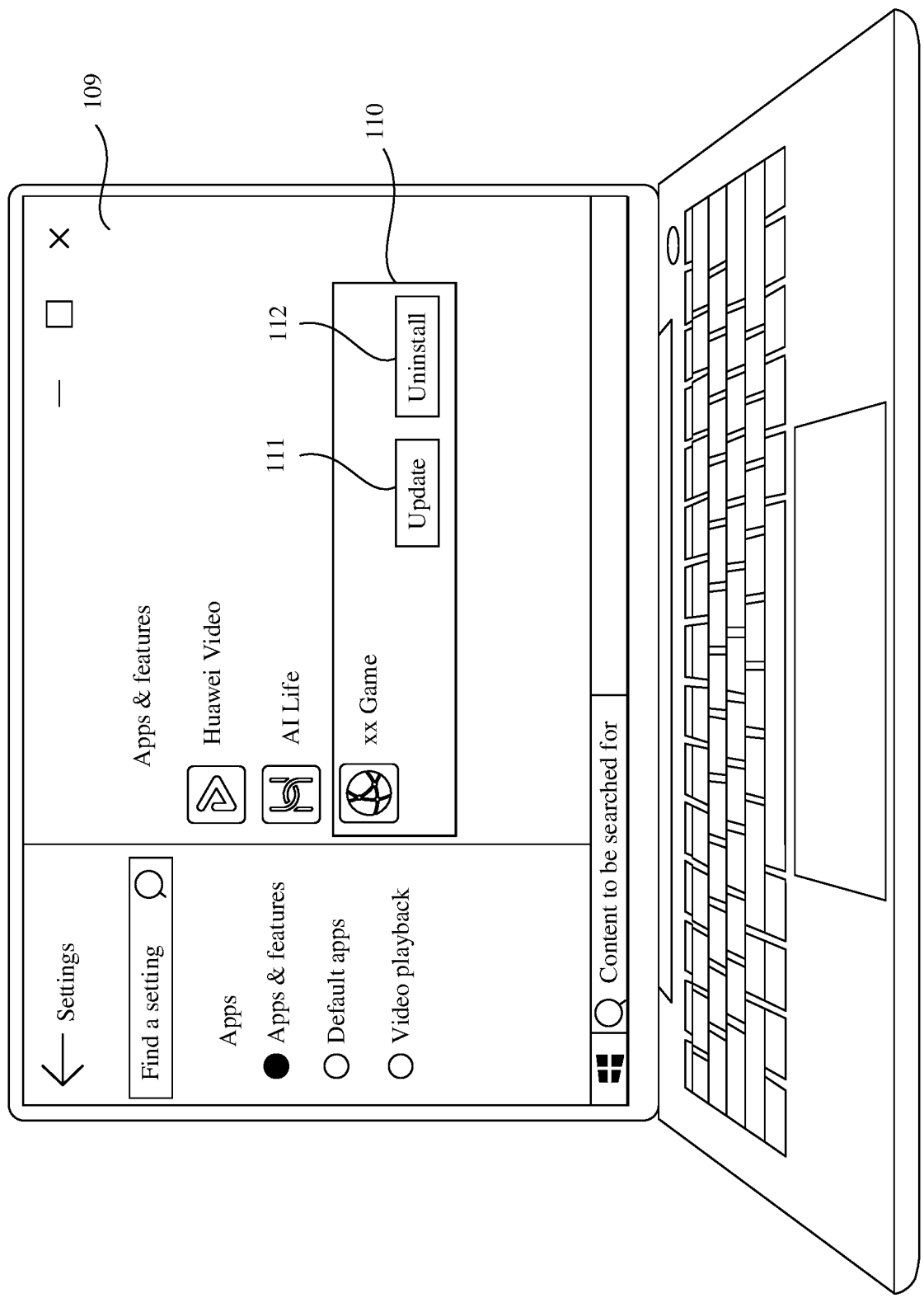
FIG. 6 is a schematic diagram 4 of an interface for applying a method for controlling installation of an Android app to a PC according to an embodiment of this application.

Manner 4: As shown in FIG. 6, the Windows terminal device may add and display a shortcut icon 110 of a target Android app on an application function interface 109 in settings, where the shortcut icon may include an application icon and an application name of the Android app.

During actual implementation, if the user taps the selected shortcut icon 110, an "Update" control 111 and an "Uninstall" control 112 are displayed. The user may perform an operation on the "Update" control 111 to trigger function updating or changing of the selected Android app, or the user may perform an operation on the "Uninstall" control 112 to trigger uninstallation of the selected Android app.

According to this solution, searching for, starting, and uninstalling the Android app on the Windows terminal device are the same as a conventional operation on a Windows app, and conform to the conventional operation habit of the Windows user, thereby improving user experience.

It can be learned that, according to the foregoing manner 1 and manner 2, after the shortcut is added to the Windows start menu or desktop, the user can find the shortcut icon of the Android app in the start menu and/or on the desktop, and can trigger starting of the Android app by performing an operation on the shortcut icon. According to the foregoing manner 3 and manner 4, after the shortcut is added to the uninstall/update program interface on the Windows control panel or the application function interface in the settings, the user can find the shortcut icon of the Android app on an interface of Control Panel→Programs→Program Uninstallation and/or on an interface of Windows Settings→Apps & features, and can trigger uninstallation or updating of the Android app by performing an operation on the shortcut icon. In this way, according to this solution, the user can use the Android app on the Windows PC more conveniently.

It should be noted that, a specific manner of adding a shortcut may be preset by the system, or may be user-defined. For example, in a process of adding a shortcut, the user may be prompted to confirm whether to add the shortcut in a manner specified by the system. If the user agrees with the manner specified by the system, the shortcut is added in the manner specified by the system. If the user does not agree with the manner specified by the system, the user may modify a shortcut option preset by the system. The shortcut option preset by the system may include at least one of the foregoing four manners, and certainly may alternatively include any other possible manner. This may be specifically determined depending on an actual use requirement, and is not limited in embodiments of this application.

In embodiments of this application, the Windows start menu, settings, control panel, and desktop are used as common control areas of the Windows operating system, and the shortcuts of the Android apps are added to these common control areas, so that app management is facilitated, and the Android apps can be more conveniently used in compatible with the Windows operating system.

Figure 7A:
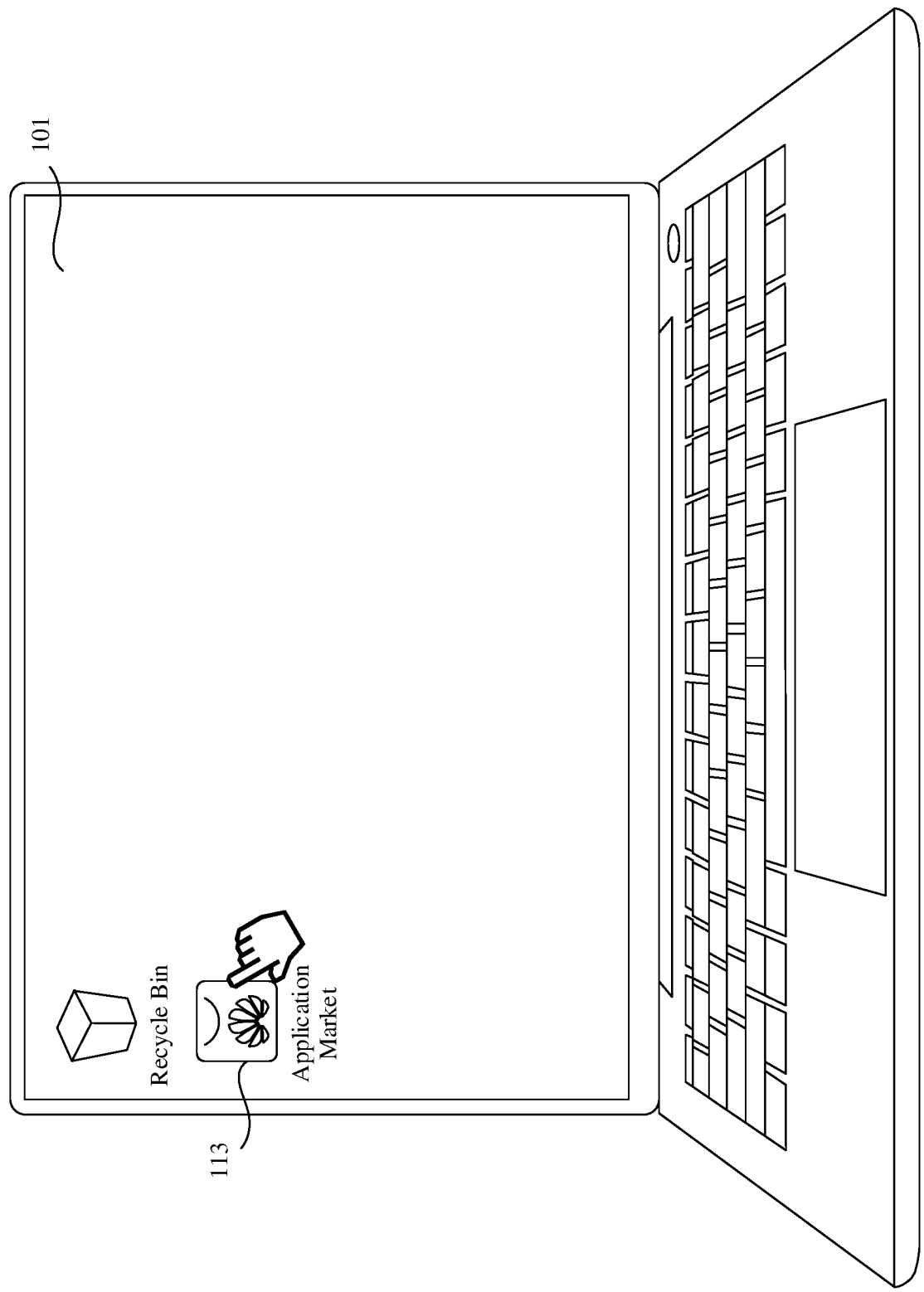
FIG. 7(a) to FIG. 7(c) is a schematic diagram 5 of an interface for applying a method for controlling installation of an Android app to a PC according to an embodiment of this application.
Figure 7B:
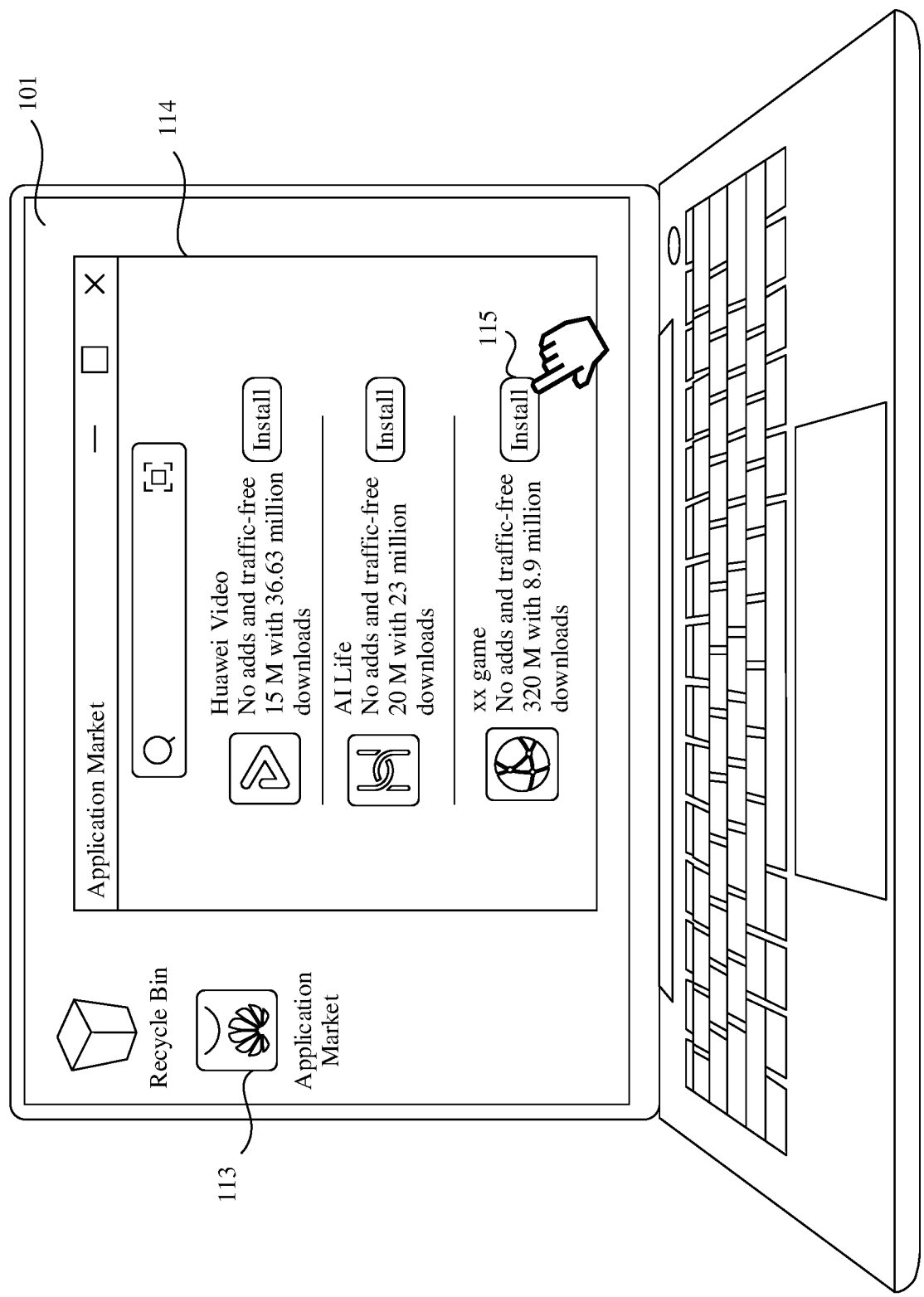
Figure 7C:
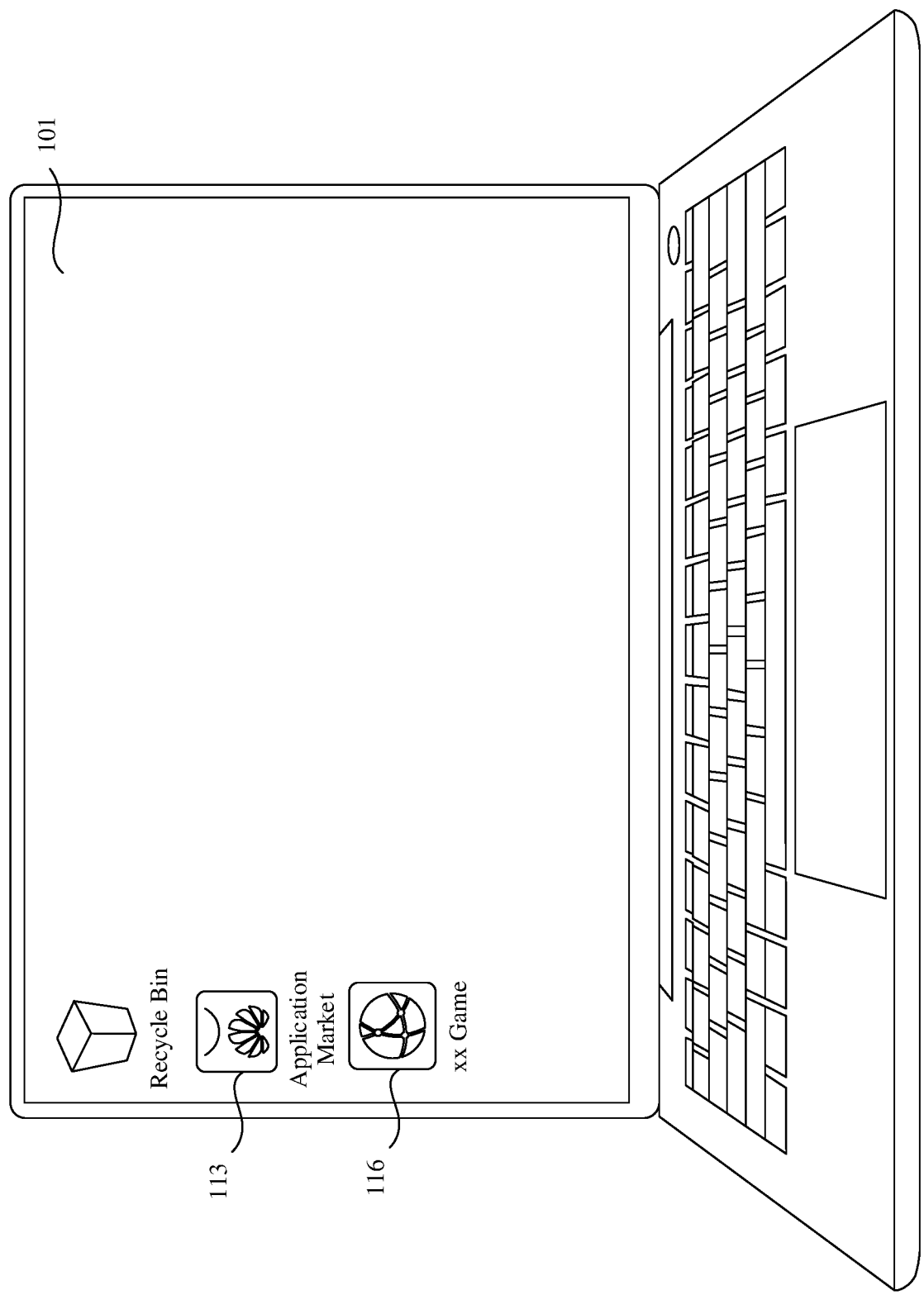

With reference to FIG. 7(*a*) to FIG. 7(*c*), the following describes, by using an example in which an Android app is installed on a Windows terminal device by using an application market, the method for controlling an Android app provided in an embodiment of this application.

As shown in FIG. 7(*a*), an app icon 113 of the Android application market is displayed on a desktop 101 of the Windows terminal device. As shown in FIG. 7(*b*), the Windows terminal device may display an interface 114 of the Android application market on the desktop 101 of the Windows terminal device in response to an input operation performed by the user on the app icon 113 of the application market. At least one Android app option is displayed on the interface 114, and each Android app option is corresponding to one installation control. If the user taps an installation control 115 corresponding to an Android app 1 option (for example, an xx game) to trigger installation, the Windows terminal device may detect a triggered installation operation performed by the user on the Android app 1. As shown in FIG. 7(*c*), after the Android app 1 is installed, an application icon 116 of the Android app 1 (the xx game) is displayed on the desktop 101 of the Windows terminal device. Certainly, in the foregoing other three manners, a shortcut icon of the Android app 1 may be alternatively added and displayed in other areas of the Windows terminal device.

According to this solution in this application, the application icon of the downloaded Android app is displayed on the Windows desktop, and then the user can trigger starting of the Android app by tapping the application icon on the Windows desktop. This can resolve a problem of poor compatibility between the Android app and the Windows operating system.

Figure 8:
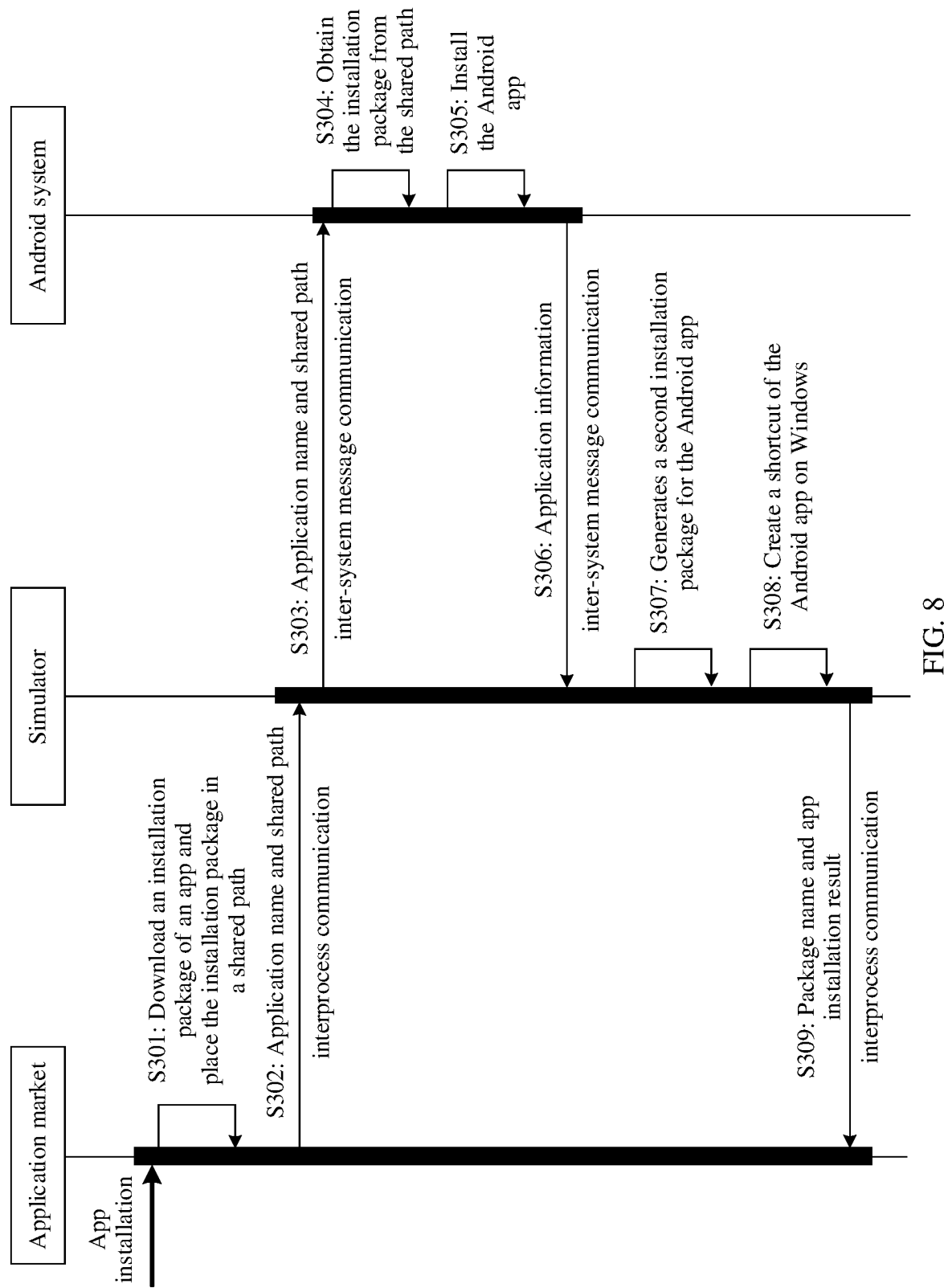
FIG. 8 is a schematic flowchart 2 of a method for controlling installation of an Android app according to an embodiment of this application.

Optionally, the Android simulator may include two functional modules: a simulator and an Android system, and the two functional modules may implement functions of the Android simulator through information exchange. A method for controlling installation of an Android app provided in embodiments of this application may be implemented jointly by using the application market, the simulator, and the Android system. With reference to FIG. 8, the following uses an example to describe an interaction process between the application market, the simulator, and the Android system when an Android app is installed on a Windows terminal device by using the application market. As shown in FIG. 8, the interaction process includes the following steps S301 to S309.

S301: In response to a triggered installation operation performed by a user on an Android app, download an installation package of the Android app from the application market, and place the installation package in a shared path.

An extension of the installation package of the Android app may be .apk.

S302: The application market sends application name information and installation package storage path information (namely, shared path information) of the Android app to the simulator through interprocess communication (interprocess communication, IPC).

An application name of the Android app may be denoted as AppName.

S303: The simulator sends the application name information and the shared path information of the Android app to the Android system through inter-system message communication.

S304: The Android system identifies and obtains the installation package of the Android app based on the application name information of the Android app and the shared path that is indicated by the shared path information of the Android app.

S305: The Android system loads the installation package of the Android app to install the Android app.

S306: The Android system sends application information of the Android app to the simulator through inter-system message communication.

Optionally, the application information (denoted as AppInfo) of the Android app may include a package name (denoted as packageName), an application icon (denoted as an icon), the application name (denoted as a name), version information (denoted as a version), landscape/portrait orientation information (denoted as an orientation), installation time (denoted as installTime), and a name identifier (denoted as exeId) that are corresponding to the Android app. It should be noted that the information included in the application information of the Android app herein is an example. Included information may be specifically determined depending on an actual use requirement, and is not limited in embodiments of this application.

S307: The simulator generates a corresponding installation package for the Android app.

The installation package generated by the simulator herein is different from the installation package downloaded from the application market mentioned above. For ease of differentiation, herein, the installation package downloaded from the application market is referred to as a first installation package, and the installation package generated by the simulator is referred to as a second installation package.

In an embodiment of this application, when the Android app is installed by using the Android system, the simulator may obtain the application information of the Android app, and invoke an API that is of a Windows operating system and that is used to install the Android app, to generate the second installation package on the Windows terminal device based on the application information of the Android app. The second installation package may be stored in a related directory of the Android simulator on the Windows terminal device.

The second installation package may include the application name corresponding to the Android app, application configuration information (denoted as config.ini), a driver (denoted as AppName.exe) used to start the Android app, and a driver (denoted as uninstall.exe) used to uninstall the Android app. The application configuration information usually includes the package name of the Android app. It should be noted that the information included in the second installation package herein is an example. Included information may be specifically determined depending on an actual use requirement, and is not limited in embodiments of this application.

S308: The simulator creates a shortcut of the Android app on the Windows operating system.

When the Android simulator has installed the target Android app, the Android simulator may create the shortcut of the target Android app on the Windows terminal device, and trigger the Windows terminal device to add and display a shortcut icon of the target Android app on the terminal device. For example, as described above, the shortcuts may be created for the Android app at four locations on the Windows PC: (1) Windows Start Menu Bar, (2) Settings→Applications, (3) Control Panel→Program Uninstallation, and (4) Desktop.

The added shortcut icon of the Android app has an association relationship with the second installation package, and the shortcut icon points to the second installation package. For example, when the user taps the shortcut icon of the Android app to start the Android app, a start command may be executed and transmitted by using content (namely, AppName.exe) in the second installation package to which the shortcut icon points, and the Android simulator starts the Android app. For example, when the user taps the shortcut icon of the Android app to uninstall the Android app, an uninstallation command may be executed and transmitted by using content (namely, uninstall.exe) in the second installation package to which the shortcut icon points, and the Android simulator uninstalls the Android app.

In an embodiment of this application, in an Android simulator scenario, the corresponding shortcut is created for the Android app on the Android simulator on the Windows terminal device. In this way, it is convenient for the user to perform an operation, for example, a viewing, starting, uninstallation, or changing operation, on the Android app at a corresponding shortcut location of the Windows terminal device.

S309: The simulator sends the package name and an app installation result of the Android app to the application market through interprocess communication.

Figure 9:
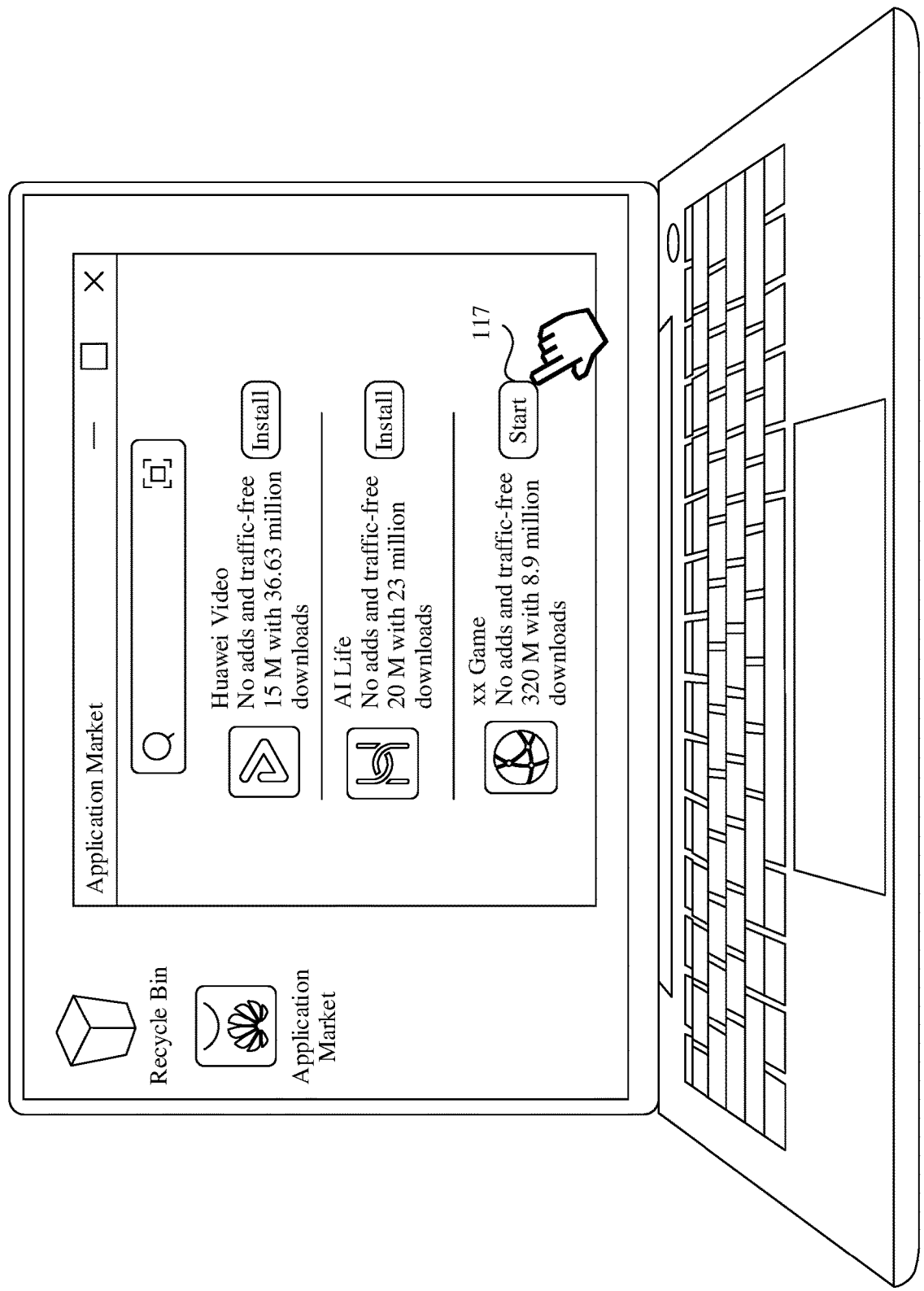
FIG. 9 is a schematic diagram 6 of an interface for applying a method for controlling installation of an Android app to a PC according to an embodiment of this application.

When the app installation result indicates that the Android app has been installed, the application market may search to find the Android app based on the package name of the Android app, and update an installation control (as shown in 115 in FIG. 7(*b*)) corresponding to the Android app to a start control or an open control (as shown in 117 in FIG. 9) for display.

It should be noted that the foregoing process of installing the Android app on the Windows terminal device by the simulator is implemented in a background, and a main window of the simulator does not need to be displayed and downloading and installation operations do not need to be performed in the main window. This is different from the conventional technology. Therefore, in this solution in this application, the user can conveniently and quickly install the Android app on the Windows terminal device.

It can be understood that the user may start the Android app by using a shortcut on the Windows operating system, or the user may trigger starting of the Android app by using the start control that is corresponding to the Android app and that is in the application market.

In an embodiment of this application, the Windows terminal device obtains information about the Android app software on the Android simulator by using an Android simulator platform, and can create the shortcuts for the Android app in common control areas of the Windows terminal device after the Android app software is installed. In this way, the user can conveniently and quickly perform an operation on the Android app on the Windows PC.

The foregoing describes a specific implementation of controlling installation of the Android app on the Windows terminal device. The following describes a specific implementation process of controlling starting and running of the Android app on the Windows terminal device with reference to the accompanying drawings.

Figure 10:
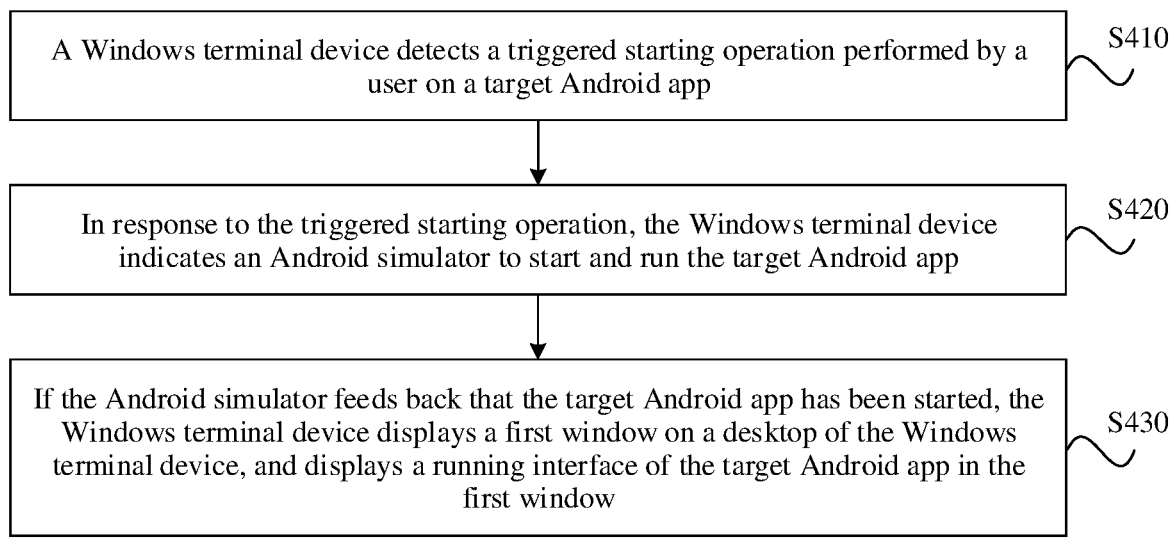
FIG. 10 is a schematic flowchart 1 of a method for controlling starting of an Android app according to an embodiment of this application.

FIG. 10 is a schematic flowchart of a method for controlling an Android app according to an embodiment of this application. The control method is applied to a process of controlling starting of an Android app on a Windows terminal device. With reference to FIG. 10, the method includes the following steps S410 to S430.

S410: The Windows terminal device detects a triggered starting operation performed by a user on a target Android app.

For example, as described above, the user may perform an operation on a shortcut icon of an Android app to trigger the Android app to start, and certainly may alternatively perform an operation on a start control that is corresponding to the Android app and that is in the application market to trigger the Android app to start.

S420: In response to the triggered starting operation, the Windows terminal device indicates an Android simulator to start and run the target Android app.

In an embodiment of this application, when the Android simulator has installed the target Android app on the Windows terminal device, in response to the triggered starting operation performed by the user on a shortcut icon of the target Android app on the Windows terminal device, the Windows terminal device invokes a driver (namely, AppName.exe) that is used to start the target Android app and that is in a second installation package associated with the shortcut icon of the target Android app, and indicates the Android simulator to start and run the target Android app.

In some embodiments, when the Android simulator has not been started, in response to the triggered starting operation performed by the user, the Windows terminal device launches the Android simulator to start in a background, and indicates the Android simulator to start and run the target Android app.

S430: If the Android simulator feeds back that the target Android app has been started, the Windows terminal device displays a first window on a desktop of the Windows terminal device, and displays a running interface of the target Android app in the first window.

The Android simulator may start the target Android app by using an Android system, draw the window, and then place the running interface of the target Android app into the window. In this way, the Windows terminal device can display the window on the desktop, where the window is used to display the running interface of the target Android app.

Figure 11:
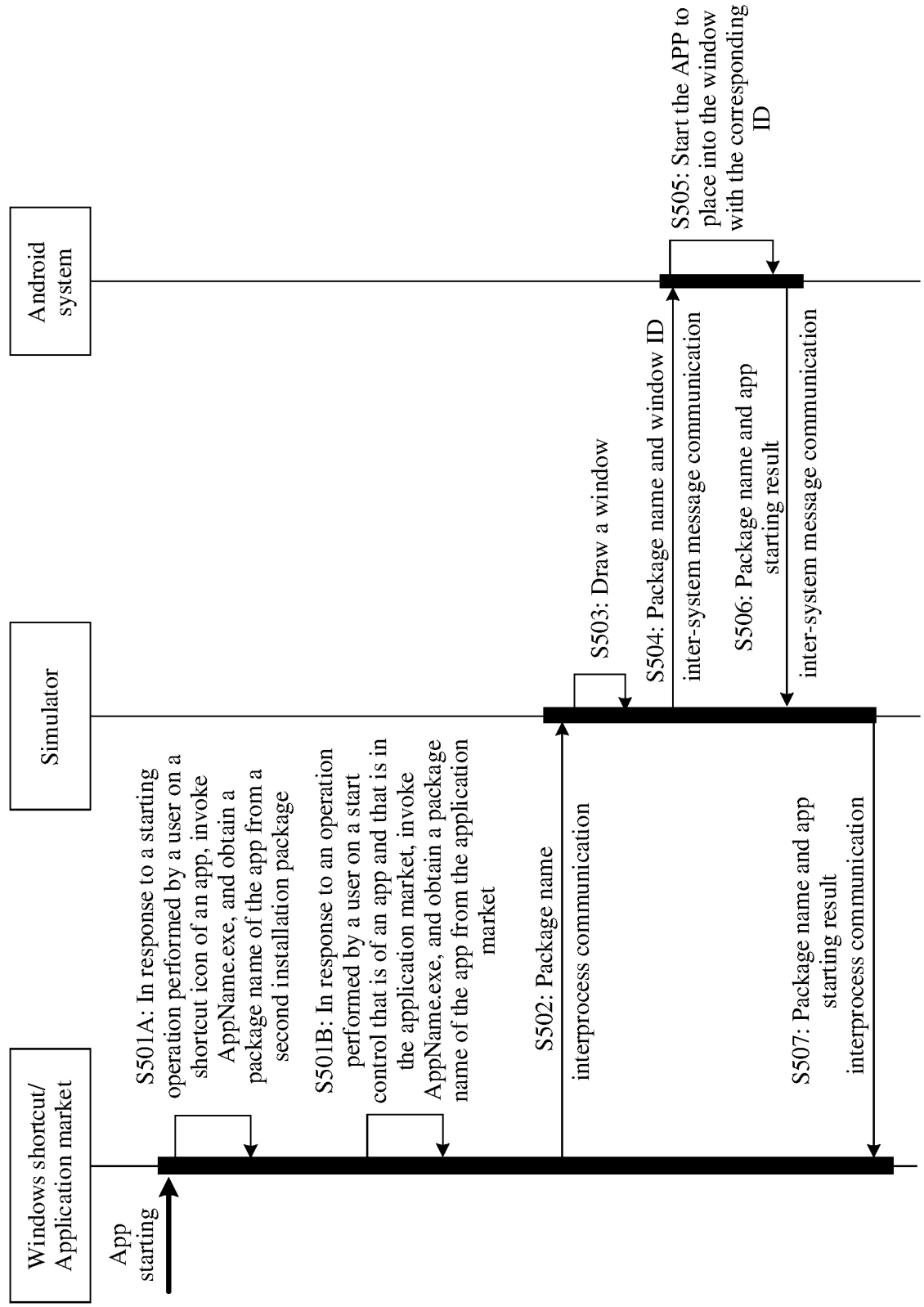
FIG. 11 is a schematic flowchart 2 of a method for controlling starting of an Android app according to an embodiment of this application.

A method for controlling starting of an Android app provided in embodiments of this application may be implemented jointly by using the application market, the simulator, and the Android system. With reference to FIG. 11, the following uses an example to describe an interaction process between a Windows terminal device (a processor), the simulator, and the Android system when an Android app is controlled to be started on the Windows terminal device. As shown in FIG. 11, the interaction process includes the following steps S501 to S507, where S501 is S501A or S501B below.

S501A: In response to a triggered starting operation performed by a user on a shortcut icon of an Android app, invoke a driver (namely, AppName.exe) that is used to start the target Android app and that is in a second installation package associated with the shortcut icon of the Android app, and obtain a package name of the Android app from the second installation package.

In response to the triggered starting operation, the Windows terminal device invokes the driver (namely, AppName.exe) that is used to start the target Android app and that is in the second installation package corresponding to the target Android app, to trigger the simulator to enable an application running function; and reads the package name of the Android app from application configuration information of the second installation package.

S501B: In response to an operation performed by a user on a start control that is corresponding to an Android app and that is in the application market, invoke a driver (namely, AppName.exe) that is used to start the target Android app and that is in a second installation package associated with a shortcut icon of the Android app, and obtain a package name of the Android app directly from the application market.

It can be learned from S501A and S501B that, when the Android app is triggered to start by using a shortcut, the Windows terminal device needs to read the package name of the Android app from the application configuration information (namely, config.ini) of the second installation package. In contrast, when the Android app is triggered to start by using the application market, the Windows terminal device may obtain the package name of the Android app directly from the application market, and does not need to read the package name from the application configuration information (namely, config.ini) of the second installation package.

It should be noted that either S501A or S501B is performed.

S502: The Windows terminal device sends the package name of the Android app to the simulator through interprocess communication, and indicates the simulator to start the Android app.

S503: The simulator draws a window for the Android app, where the window has a window identifier (identifier, ID).

The simulator may search the simulator to find the Android app based on the package name of the Android app, and create the window corresponding to the Android app on the Windows terminal device.

S504: The simulator sends the package name and the window ID of the Android app to the Android system through inter-system message communication.

S505: The Android system starts the Android app, and places a running interface of the target Android app into the window.

S506: The Android system feeds back the package name and an app starting result of the Android app to the simulator through inter-system message communication.

S507: The simulator feeds back the package name and the app starting result of the Android app to the application market through interprocess communication.

When the app starting result indicates that the Android app has been started, the Windows terminal device may display the running interface of the Android app on a desktop.

Optionally, the Android simulator may draw the first window on the Windows terminal device (for example, the desktop) based on landscape/portrait orientation information corresponding to the Android app, to carry the running interface of the Android app. A display form (a landscape orientation or a portrait orientation) of the first window may be determined based on the landscape/portrait orientation information. In this way, whether the running interface of the Android app is displayed in a landscape orientation or a portrait orientation is also determined accordingly. The portrait orientation may mean that a vertical size of the first window (that is, the running interface of the Android app) is greater than a horizontal size of the first window, and the landscape orientation may mean that a horizontal size of the first window (that is, the running interface of the Android app) is greater than a vertical size of the first window.

Specifically, if the landscape/portrait orientation information indicates a landscape orientation, the running interface of the Android app is displayed on the Windows desktop in a landscape orientation; or if the landscape/portrait orientation information indicates a portrait orientation, the running interface of the Android app is displayed on the Windows desktop in a portrait orientation.

Figure 12:
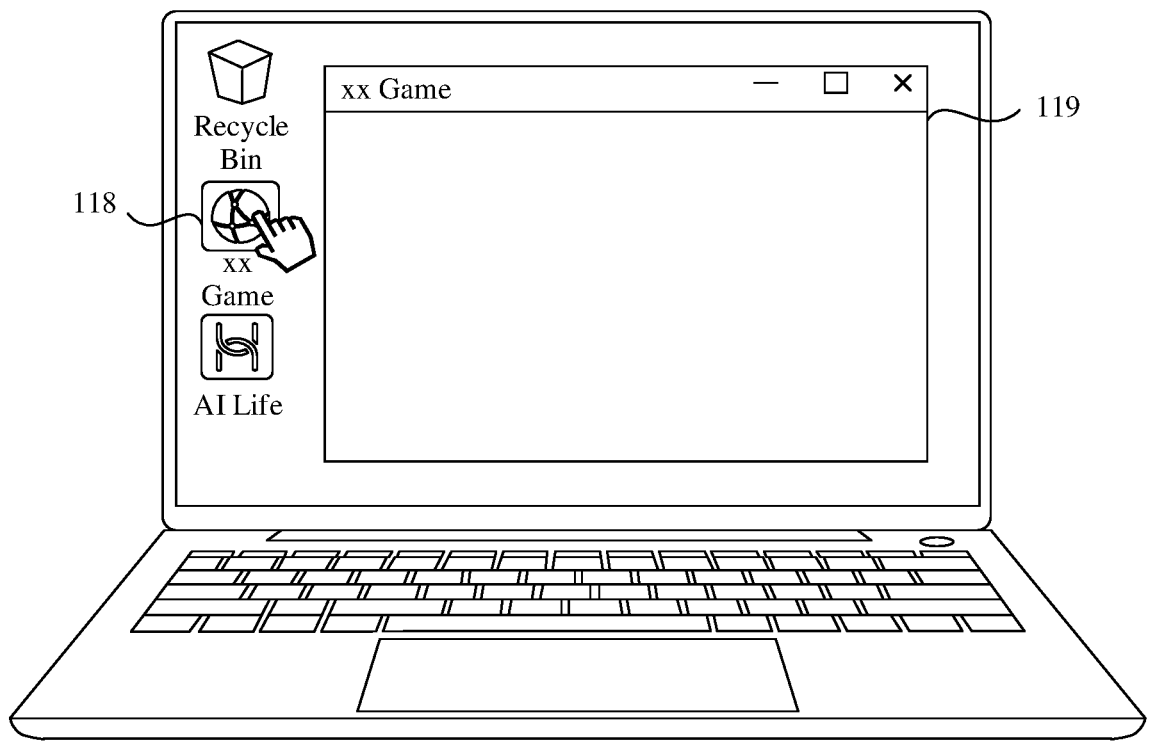
FIG. 12 is a schematic diagram of an interface for applying a method for controlling starting of an Android app to a PC according to an embodiment of this application.
Figure 12:
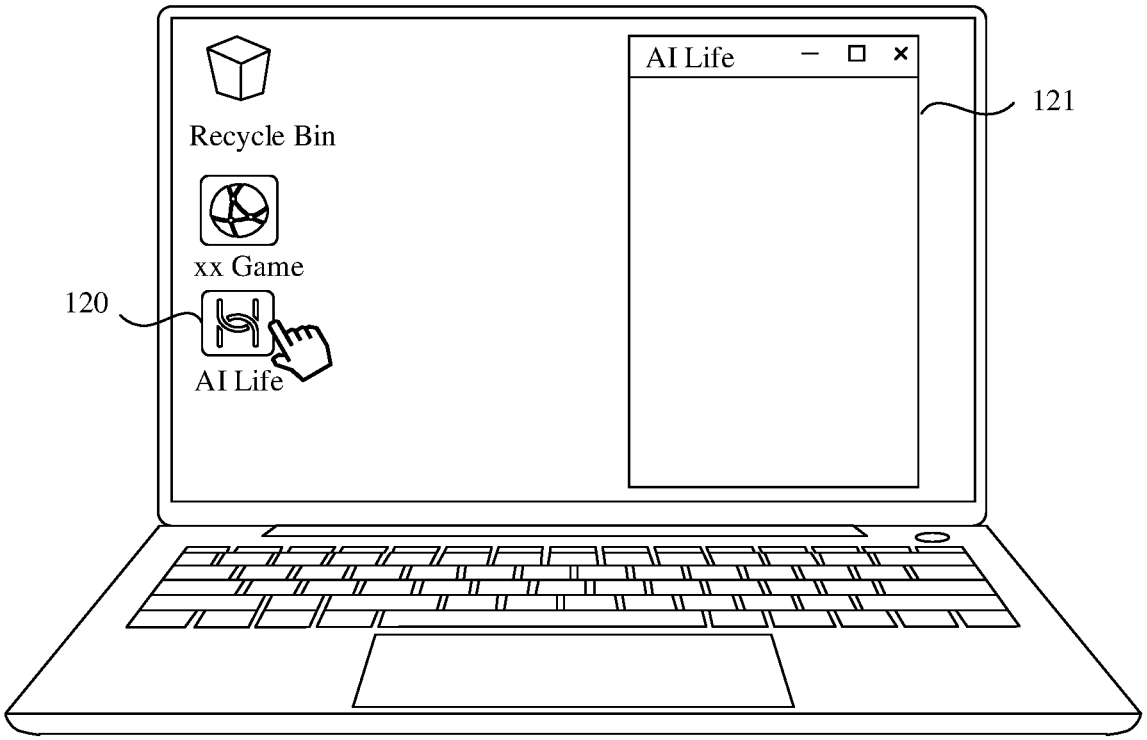

For example, as shown in (a) in FIG. 12, landscape/portrait orientation information corresponding to an Android app 118 (for example, an xx game in the figure) indicates that a running interface of the xx game app is a displayed in landscape mode, and a running interface 119 after the xx game app is started is displayed with a landscape orientation effect.

For another example, as shown in (b) in FIG. 12, landscape/portrait orientation information corresponding to an Android app 120 (for example, AI Life in the figure) indicates that a running interface of the AI Life app is a displayed in portrait mode, and a running interface 121 after the AI Life app is started is displayed with a portrait orientation effect.

It should be noted that the foregoing process of starting the Android app on the Windows terminal device by the simulator is implemented in a background, and a main window of the simulator does not need to be displayed and a starting operation does not need to be performed in the main window. This is different from the conventional technology. Therefore, in this solution in this application, the user can conveniently and quickly start the Android app on the Windows terminal device.

The foregoing describes specific implementations of controlling installation and starting of the Android app on the Windows terminal device. The following describes a specific implementation process of controlling uninstallation of the Android app on the Windows terminal device with reference to the accompanying drawings.

Figure 13:
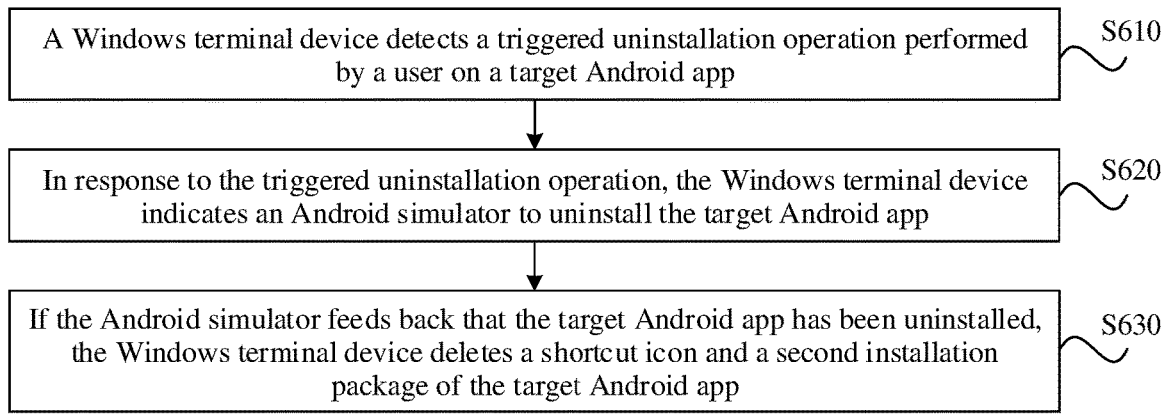
FIG. 13 is a schematic flowchart 1 of a method for controlling uninstallation of an Android app according to an embodiment of this application.

FIG. 13 is a schematic flowchart of a method for controlling an Android app according to an embodiment of this application. The control method is applied to a process of controlling uninstallation of an Android app on a Windows terminal device. With reference to FIG. 13, the method includes the following steps S610 to S630.

S610: The Windows terminal device detects a triggered uninstallation operation performed by a user on a target Android app.

For example, as described above, the user may perform an uninstallation operation on a shortcut icon of an Android app to trigger uninstallation of the Android app. For example, the Android app may be uninstalled by performing an operation on an interface of Settings→Application Functions of the Windows terminal device, or the Android app may be uninstalled by performing an operation on an interface of Control Panel→Program Uninstallation of the Windows terminal device.

S620: In response to the triggered uninstallation operation, the Windows terminal device indicates an Android simulator to uninstall the target Android app.

In an embodiment of this application, when the Android simulator has installed the target Android app on the Windows terminal device, in response to the triggered uninstallation operation performed by the user on a shortcut icon of the target Android app on the Windows terminal device, the Windows terminal device invokes a driver (namely, uninstall.exe) that is used to uninstall the target Android app and that is in a second installation package associated with the shortcut icon of the target Android app, and indicates the Android simulator to uninstall the target Android app.

In some embodiments, when the Android simulator has not been started, in response to the triggered uninstallation operation performed by the user, the Windows terminal device launches the Android simulator to start in a background, and indicates the Android simulator to uninstall the target Android app.

S630: If the Android simulator feeds back that the target Android app has been uninstalled, the Windows terminal device deletes the shortcut icon and the second installation package of the target Android app from the terminal device.

Figure 14:
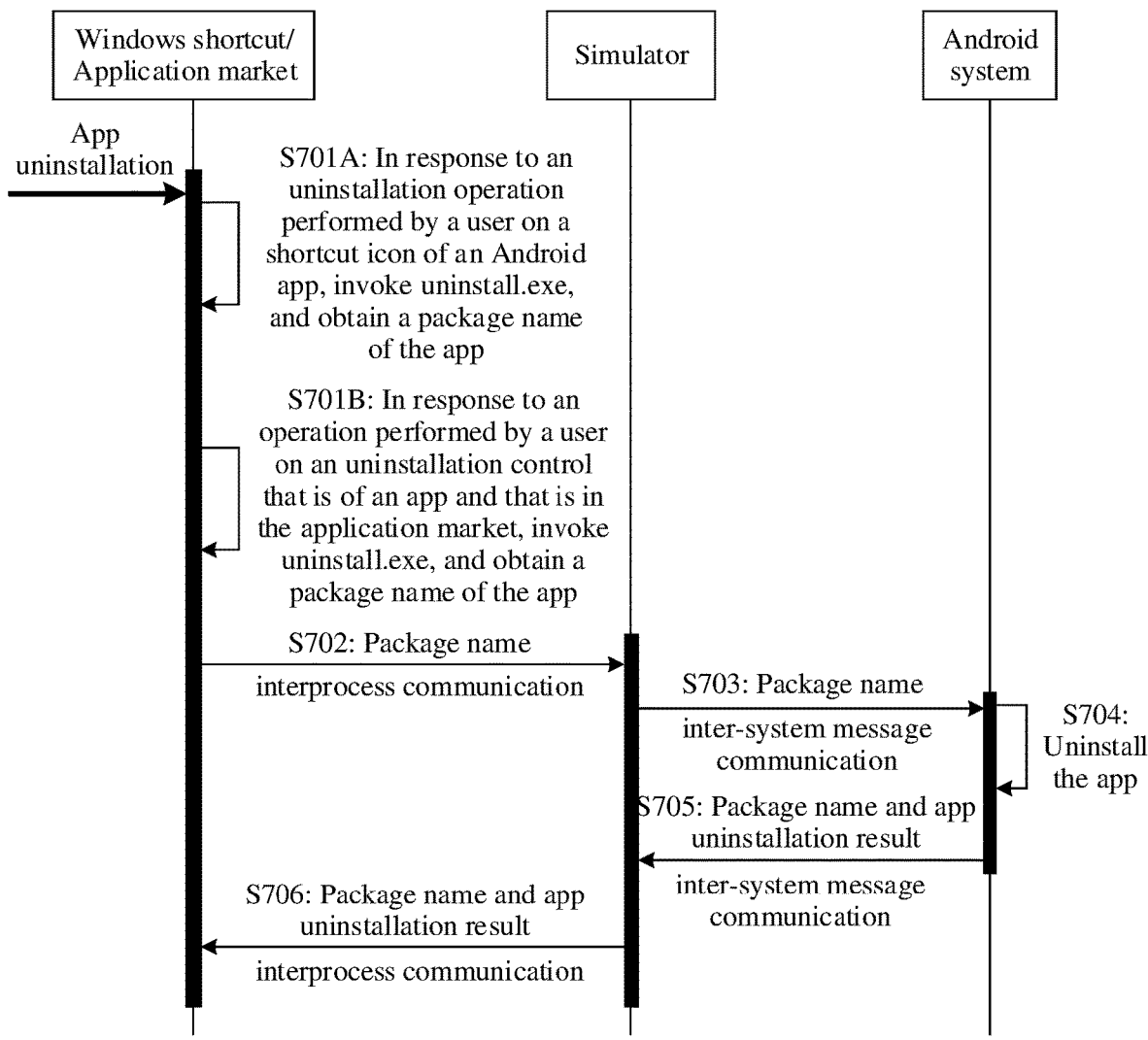
FIG. 14 is a schematic flowchart 2 of a method for controlling uninstallation of an Android app according to an embodiment of this application.

A method for controlling uninstallation of an Android app provided in embodiments of this application may be implemented jointly by using the application market, the simulator, and the Android system. With reference to FIG. 14, the following uses an example to describe an interaction process between a Windows terminal device (a processor), the simulator, and the Android system when an Android app is controlled to be uninstalled on the Windows terminal device. As shown in FIG. 14, the interaction process includes the following steps S701 to S706, where S701 is S701A or S701B below.

S701A: In response to a triggered uninstallation operation performed by a user on a shortcut icon of an Android app, invoke a driver (namely, uninstall.exe) that is used to uninstall the target Android app and that is in a second installation package associated with the shortcut icon of the Android app, and obtain a package name of the Android app.

In response to the triggered uninstallation operation, the Windows terminal device invokes the driver (namely, uninstall.exe) that is used to uninstall the target Android app and that is in the second installation package corresponding to the target Android app, to trigger the simulator to enable an application uninstallation function; and reads the package name of the Android app from application configuration information of the second installation package.

S701B: In response to an operation performed by a user on an uninstallation control that is corresponding to an Android app and that is in the application market, invoke a driver (namely, uninstall.exe) that is used to uninstall the target Android app and that is in a second installation package associated with a shortcut icon of the Android app, and the Windows terminal device obtains a package name of the Android app directly from the application market.

It can be learned from S701A and S701B that, when the Android app is trigger to uninstall by using a shortcut, the Windows terminal device needs to read the package name of the Android app from the application configuration information (namely, config.ini) of the second installation package. In contrast, when the Android app is triggered to uninstall by using the application market, the Windows terminal device may obtain the package name of the Android app directly from the application market, and does not need to read the package name from the application configuration information (namely, config.ini) of the second installation package.

It should be noted that either S701A or S701B is performed.

S702: The Windows terminal device sends the package name of the Android app to the simulator through interprocess communication, and indicates the simulator to uninstall the Android app.

S703: The simulator forwards the package name of the Android app to the Android system through inter-system message communication.

S704: The Android system uninstalls the Android app.

To be specific, the simulator searches the simulator to find the Android app based on the package name of the Android app, and uninstalls the Android app by using the Android system.

S705: The Android system feeds back the package name and an app uninstallation result of the Android app to the simulator through inter-system message communication.

S706: The simulator feeds back the package name and the app uninstallation result of the Android app to the Windows terminal device through interprocess communication.

When the app uninstallation result indicates that the Android app has been uninstalled, the simulator may invoke an API that is of a Windows operating system and that is used to uninstall the app, to delete the shortcut icon of the Android app from the Windows terminal device, and delete the second installation package of the Android app.

In addition, when the app uninstallation result indicates that the Android app has been uninstalled, the application market on the Windows terminal device may search to find the Android app based on the package name of the Android app, and update a start control or an open control (as shown in 117 in FIG. 9) corresponding to the Android app to an installation control (as shown in 115 in FIG. 7(b)) for display.

It should be noted that the foregoing process of uninstalling the Android app on the Windows terminal device by the simulator is implemented in a background, and a main window of the simulator does not need to be displayed and an uninstallation operation does not need to be performed in the main window. This is different from the conventional technology. Therefore, in this solution in this application, the user can conveniently and quickly uninstall the Android app on the Windows terminal device.

It should be noted that in the foregoing embodiments, that the terminal device is an execution body is used as an example for description. During actual implementation, the execution body may be specifically a central processing unit (central processing unit, CPU) in the terminal device.

Optionally, in an embodiment of this application, the shortcut icon of the Android app and a shortcut icon of a Windows app may have a same display style, and the user does not need to distinguish between the two shortcut icons. In this way, the user has different feelings for using the Windows app and the Android app on the Windows terminal device. Alternatively, the shortcut icon of the Android app and a shortcut icon of a Windows app may have different display styles, so that the user can distinguish between the two shortcut icons. In this way, the user can separately perform targeted operations on the Windows app and the Android app. Specifically, whether the shortcut icon of the Android app and the shortcut icon of the Windows app have a same display style may be determined depending on an actual use requirement, and is not limited in embodiments of this application.

Optionally, in an embodiment of this application, a file name corresponding to the shortcut icon includes a preset character and an application name of the target Android app. The preset character may be a null (unicode) character or an invisible character.

Optionally, there may be one or more preset characters. This may be specifically determined depending on an actual use requirement, and is not limited in embodiments of this application.

Optionally, a location at which the preset character is added is not limited in embodiments of this application. For example, the preset character may be located before the application name of the target Android app, may be located after the application name of the target Android app, or may be located in the application name of the target Android app. This may be specifically determined depending on an actual use requirement, and is not limited in embodiments of this application.

It should be noted that a difference between the blank character and the invisible character lies in that the blank character may be displayed, and the invisible character is not displayed. For example, if a space is added to the middle of "application market", a display effect may be "application market". If an invisible character is added to the middle of "application market", "application market" is still displayed. In some embodiments, an invisible character may be added before the application name, and it seems that the application name does not change from a perspective of the user. This can avoid a problem of duplicate names and avoid misleading the user.

Figure 15:
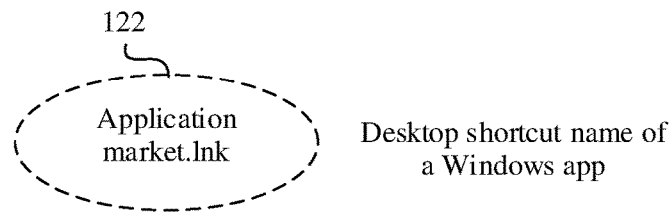
FIG. 15 is a schematic diagram of desktop shortcut names in a method for controlling installation of an Android app according to an embodiment of this application.
Figure 15:
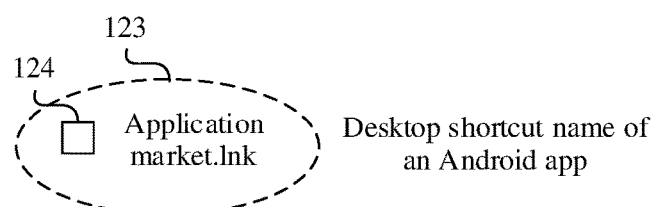
Figure 15:
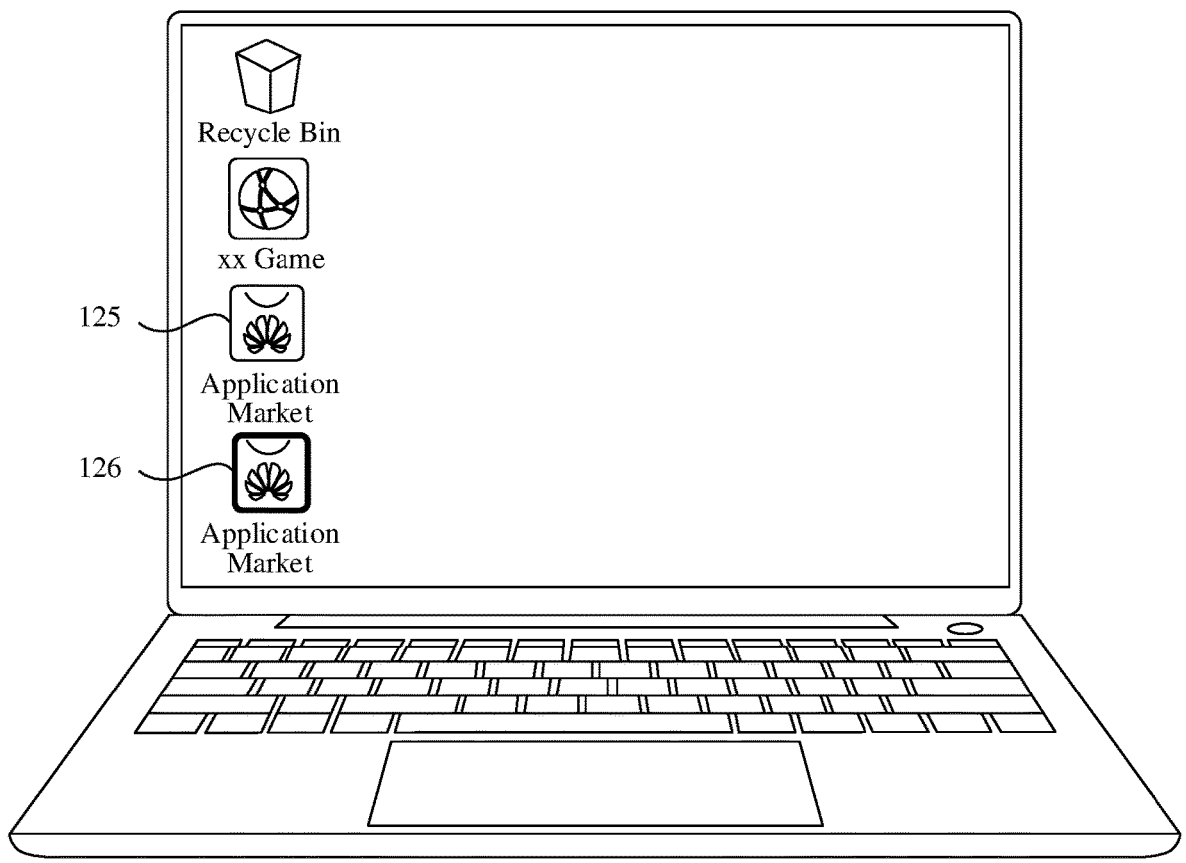

For example, as shown in (a) in FIG. 15, a desktop shortcut name 122 of a Windows app application market includes an application name "application market", and does not include other characters; and a desktop shortcut name 123 of an Android app application market includes both an application name "application market" and an invisible character 124. In other words, an Android app and a Windows app have different desktop shortcut names. Then, in terms of display effects, as shown in (b) in FIG. 15, a desktop shortcut name 125 of the Android app application market and a desktop shortcut name 126 of the Windows app application market have a same display effect. In this way, the invisible character is used at a location before the application name of the Android app, to ensure that a shortcut corresponding to a simulator is specially processed, so that the Android app installed by the simulator and the Windows app on a Windows desktop may have duplicate names.

In comparison with the conventional technology in which a problem of duplicate names is resolved by adding an application name and an extension of a simulator name, in embodiments of this application, the preset character is added to the file name corresponding to the shortcut icon. Therefore, the problem that the Android app and the Windows app on the Windows desktop have duplicate names can be avoided.

Optionally, in an embodiment of this application, a quantity of blank characters in a file name corresponding to each shortcut icon may be recorded in a database of the Windows terminal device, and may be represented by using exe_id. apps with a same file name may be distinguished from each other based on the quantity of blank characters. For example, the quantity of blank characters may be used to assist app uninstallation during app uninstallation.

Figure 16:
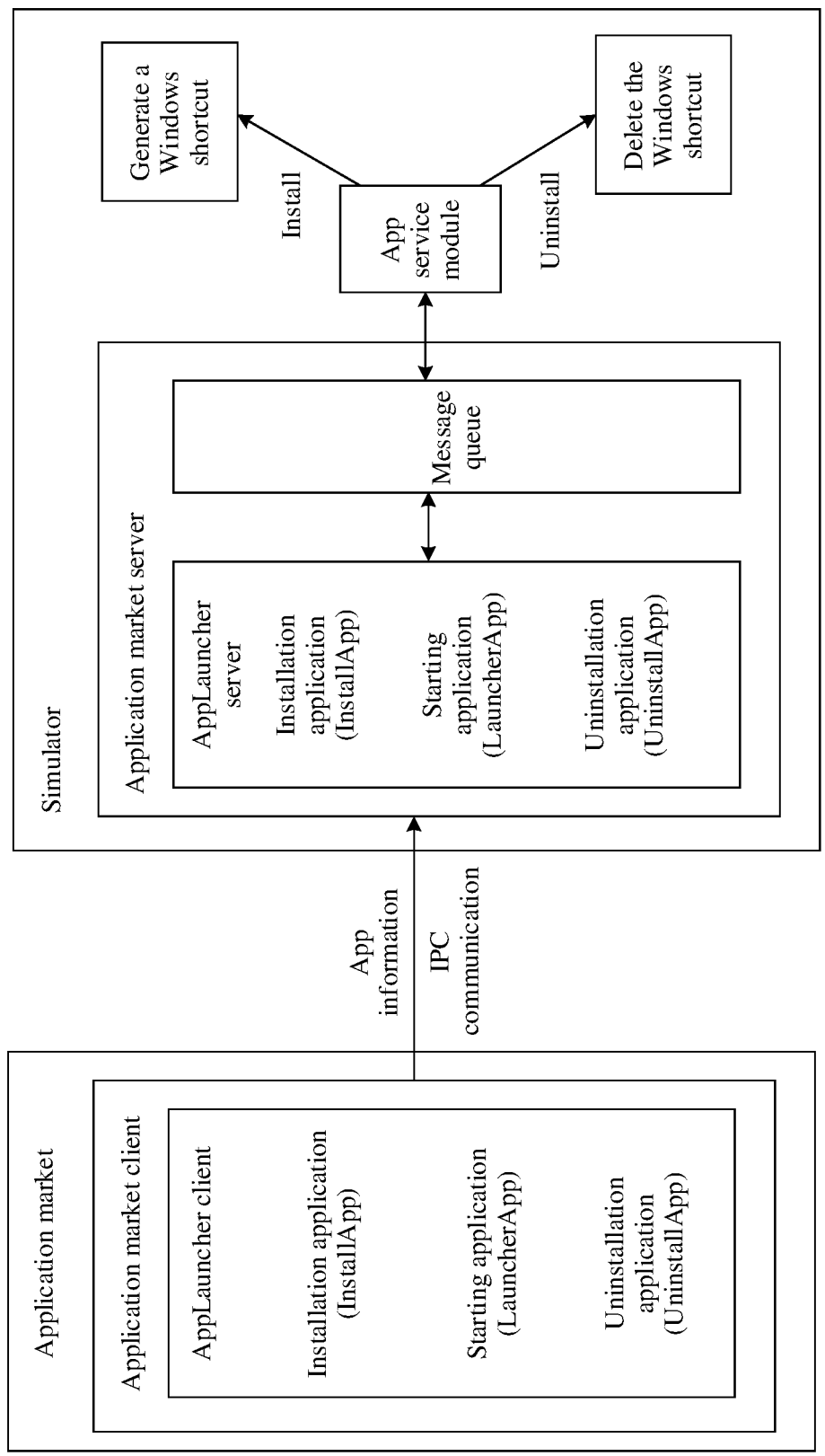
FIG. 16 is a schematic flowchart of a method for controlling installation, starting, or uninstallation of an Android app according to an embodiment of this application.

With reference to FIG. 16, the following uses an example to describe a method for controlling an Android app provided in embodiment of this application. It is assumed that two pieces of software, namely, an application market and a simulator, are installed on a Windows PC. FIG. 16 is a schematic diagram of an interaction process between an application market and a simulator according to an embodiment of this application, and shows a process of finally generating or deleting a shortcut on the Windows terminal device. As shown in FIG. 16, an application market is used as an application market client (AppMarketClient), and the application market client is functioned as an application launcher (AppLauncher) client. The client may be used to launch an installation application (InstallApp), a starting application (LauncherApp), and an uninstallation application (UninstallApp). Correspondingly, the simulator is used as an application market server (AppMarketServer), and the application market server is functioned as an application launcher (AppLauncher) server. The server may be used to launch the InstallApp, the LauncherApp, and the UninstallApp. The application market interacts with the simulator through IPC communication.

Specifically, after an Android app is installed by using the application market on the Windows terminal device, the AppLauncher of a Windows operating system sends app information (that is, AppMessage, for example, an application name and installation package storage path information) of the Android app to the AppLauncher of the simulator through IPC communication, and then sends the application information of the Android app to an application service (AppService) module of the simulator by using a message queue. The app service module invokes a Windows API interface, to generate a shortcut of the Android app on the Windows operating system. In other words, in an embodiment of this application, the AppLauncher transmits the app information, and the simulator creates the related shortcut for the installed Android app on the Windows operating system by using the app information, so that a user uses the Android app on the Windows PC more conveniently and quickly. As described above, a location of the shortcut may include at least one of the following: (1) Windows Start Menu Bar, (2) Settings→Applications, (3) Control Panel-→Programs→Program Uninstallation, and (4) Desktop shortcut. Similar to the foregoing manner, the shortcut of the Android app may be deleted when the Android app is uninstalled. The AppLauncher of the simulator may generate a second installation package on the Windows operating system, and write the app information into the Windows operating system, so that the app information can be invoked by using the API of the Windows operating system.

In embodiments of this application, the Android app is conveniently and quickly managed and controlled on the Windows PC, and a process of a management and control operation on the Android app on the Windows PC is the same as a management and control operation on a Windows app.

In this solution in this application, operation processes of managing the Android app by using a start menu of the Windows operating system and uninstalling the Android app from the start menu, the settings, and the control panel all conform to a conventional operation habit of the Windows user. This helps expand a user group of products.

It should also be noted that in embodiments of this application, "greater than" may be replaced by "greater than or equal to", and "less than or equal to" may be replaced by "less than"; or "greater than or equal to" may be replaced by "greater than", and "less than" may be replaced by "less than or equal to".

Embodiments described in this specification may be independent solutions, or may be combined based on internal logic. All these solutions fall within the protection scope of this application.

It can be understood that in the foregoing method embodiments, the methods and operations implemented by the terminal device may be alternatively implemented by a component (for example, a chip or a circuit) that can be used for the terminal device.

The foregoing describes the method embodiments provided in this application, and the following describes apparatus embodiments provided in this application. It should be understood that descriptions of the apparatus embodiments are corresponding to the descriptions of the method embodiments. Therefore, for content that is not detailed, reference may be made to the foregoing method embodiments. For brevity, details are not described herein again.

The foregoing mainly describes, from perspectives of method steps, the solutions provided in embodiments of this application. It can be understood that, to implement the foregoing functions, the terminal device that implements the methods includes a corresponding hardware structure and/or software module for performing each function. A person skill in the art should be aware that, in combination with the examples described in embodiments disclosed in this specification, units and algorithm steps can be implemented by hardware or a combination of hardware and computer software in this application. Whether a function is performed by hardware or by computer software driving hardware depends on particular applications and design constraints of the technical solutions. A person skilled in the art may use a different method to implement the described functions for each particular application, but it should not be considered that the implementation goes beyond the protection scope of this application.

In embodiments of this application, functional modules of the terminal device may be obtained through division based on the foregoing method examples. For example, functional modules may be obtained through division in correspondence to functions, or at least two functions may be integrated into one processing module. The integrated module may be implemented in a form of hardware, or may be implemented in a form of a software functional module. It should be noted that the module division in embodiments of this application is an example, is merely logical function division, and may be other division during actual implementation. The following uses an example for description in which functional modules are obtained through division in correspondence to functions.

Figure 17:
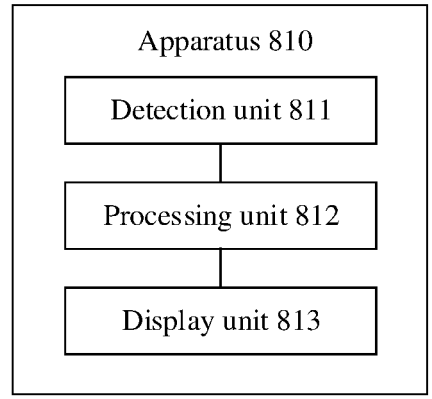
FIG. 17 is a schematic diagram 1 of a structure of an apparatus for controlling an Android app according to an embodiment of this application.

FIG. 17 is a schematic block diagram of an apparatus 810 for controlling an Android app on a Windows operating system according to an embodiment of this application. The apparatus 810 may be configured to perform actions performed by the Windows terminal device in the foregoing method embodiments. The apparatus 810 includes a detection unit 811, a processing unit 812, and a display unit 813.

The detection unit 811 is configured to detect an installation, starting, or uninstallation operation performed by a user on a target Android app on a terminal device.

The processing unit 812 is configured to install, start, or uninstall the target Android app by using an Android simulator, in response to the installation, starting, or uninstallation operation performed by the user on the target Android app on the terminal device, where the target Android app is an application applicable to an Android operating system.

The display unit 813 is configured to:
- when the Android simulator installs the target Android app, display a shortcut icon of the target Android app on the terminal device; or
- when the Android simulator starts the target Android app, display a running interface of the target Android app on a desktop of the terminal device; or
- when the Android simulator uninstalls the target Android app, delete a shortcut icon of the target Android app from the terminal device.

According to this solution in this application, the Windows terminal device creates a shortcut for the Android app in a common control area by using an Android simulator platform, so that the Android app can be conveniently controlled (for example, downloaded, started, uninstalled, or changed) on the Windows operating system. This is the same as a manner of performing an operation on Windows software on the Windows operating system, and conforms to a conventional operation habit of the Windows user. The user does not need to manually trigger the simulator to start, and does not need to perform an operation in a main window of the simulator to use the Android app. Therefore, this solution can improve user experience.

In some embodiments, the processing unit 812 is specifically configured to: in response to the installation, starting, or uninstallation operation performed by the user on the target Android app on the terminal device, start the Android simulator in a background of the terminal device, and install, start, or uninstall the target Android app by using the Android simulator.

According to this solution in this application, from a perspective of use experience of the user, because the simulator runs in the background and is not displayed in a foreground (that is, the desktop of the Windows operating system), the user is unaware of the simulator, and intuitively feels that the Android app is directly controlled on the Windows operating system. This conforms to the conventional operation habit of the Windows user, thereby improving user experience.

In some embodiments, the display unit 813 is specifically configured to: after the Android simulator invokes a first application programming interface API of the Windows operating system to create a shortcut of the target Android app on the terminal device, display, by the display unit 813, a shortcut icon of the target Android app on the terminal device.

In some embodiments, the display unit 813 is specifically configured to:
- display the shortcut icon of the target Android app in a start menu of the terminal device; and/or
- display the shortcut icon of the target Android app on an uninstall or change program interface on a control panel of the terminal device; and/or
- display the shortcut icon of the target Android app on the desktop of the terminal device; and/or
- display the shortcut icon of the target Android app on an application function interface in settings of the terminal device.

According to this solution, the Windows terminal device may create shortcuts for the Android app in common control areas, that is, in the start menu and the settings and on the control panel and the desktop, by using the Android simulator platform. In this way, it is convenient for the user to perform an operation, for example, a viewing, starting, uninstallation, or changing operation, on the Android app at a corresponding shortcut location of the Windows terminal device.

In some embodiments, a file name corresponding to the shortcut icon includes a preset character and an application name of the target Android app, and the preset character may be a blank character or an invisible character.

Optionally, in some embodiments, the apparatus 810 further includes a downloading unit and a storage unit.

The downloading unit is configured to: in response to the triggered installation operation performed by the user on the target Android app on the terminal device, download a first installation package of the target Android app.

The storage unit is configured to store the first installation package of the target Android app in a shared path in the terminal device.

In some embodiments, the downloading unit is specifically configured to download the first installation package of the target Android app from an application market, where
the responding, by the processing unit 812, to the triggered installation operation performed by the user on the target Android app on the terminal device includes: responding, by the processing unit 812, to a triggered installation operation performed by the user on an installation control that is corresponding to the target Android app and that is in the application market.

In some embodiments, the display unit 813 is further configured to:
- if the application market is an exe file and is installed on the terminal device, when the exe file is launched, present a running interface of the application market on the terminal device; or
- if the application market is an exe file and is associatively installed in an application market apk in the Android simulator, when an instruction of the user for running the exe file is received, launch the application market apk in the Android simulator, and display a running interface of the application market on the terminal device.

Optionally, in some embodiments, the apparatus 810 further includes a transceiver unit. The transceiver unit is configured to send application name information and installation package storage path information of the target Android app to the Android simulator through interprocess communication.

Further, the Android simulator obtains the first installation package of the target Android app based on the application name information of the target Android app and the shared path that is indicated by the installation package storage path information of the target Android app.

Further, the Android simulator loads the first installation package of the target Android app by using the Android system, to install the target Android app.

In some embodiments, when the Android simulator installs the target Android app, the Android simulator obtains application information of the target Android app, where the application information of the target Android app includes a package name, an application icon, the application name, version information, landscape/portrait orientation information, installation time, and/or a name identifier that are/is corresponding to the target Android app.

Further, the Android simulator generates, on the terminal device based on the application information of the target Android app, a second installation package associated with the shortcut icon of the target Android app, where the second installation package includes the application name, application configuration information, a driver used to start the target Android app, and a driver used to uninstall/update the target Android app that are corresponding to the target Android app.

In some embodiments, the transceiver unit is further configured to: after the Android simulator installs the target Android app, send a first response message to the application market through interprocess communication, where the first response message includes a package name of the target Android app and a result indicating that the target Android app has been installed.

Further, the application market updates, based on the first response message, the installation control that is corresponding to the target Android app and that is in the application market to a start control for display.

In some embodiments, the processing unit 812 is specifically configured to: in response to a starting operation performed by the user on the shortcut icon of the target Android app, invoke a driver that is used to start the target Android app and that is in the second installation package associated with the shortcut icon of the target Android app, to trigger the Android simulator to enable an app starting function.

The transceiver unit is further configured to: read the package name of the target Android app from the application configuration information of the second installation package, and send the package name of the target Android app to the Android simulator.

Further, the Android simulator searches the Android simulator to find the target Android app based on the package name of the target Android app, draws, on the terminal device, a first window corresponding to the target Android app, starts the target Android app by using the Android system, and places the running interface of the target Android app into the first window.

In some embodiments, the processing unit 812 is specifically configured to: in response to an uninstallation operation performed by the user on the shortcut icon of the target Android app on the terminal device, invoke a driver that is used to uninstall the target Android app and that is in the second installation package corresponding to the target Android app, to trigger the Android simulator to enable an app uninstallation function, read the package name of the target Android app from the application configuration information of the second installation package, and send the package name of the target Android app to the Android simulator.

Further, the Android simulator searches the Android simulator to find the target Android app based on the package name of the target Android app, and uninstalls the target Android app by using the Android system.

In some embodiments, the deleting a shortcut icon of the target Android app from the terminal device includes: The Android simulator invokes a second API of the Windows operating system, to delete, from the terminal device, the shortcut icon and the second installation package of the target Android app.

In some embodiments, the transceiver unit is further configured to: after the Android simulator uninstalls the target Android app, send a second response message to the application market on the terminal device through interprocess communication by using the Android simulator, where the second response message includes the package name of the target Android app and a result indicating that the target Android app has been uninstalled.

Further, the application market updates, based on the second response message, the start control corresponding to the target Android app to the installation control for display.

The apparatus 810 according to an embodiment of this application may correspondingly perform the methods described in embodiments of this application, and the foregoing and other operations and/or functions of the units in the apparatus 810 are used to implement corresponding procedures of the methods. For brevity, details are not described herein again.

Figure 18:
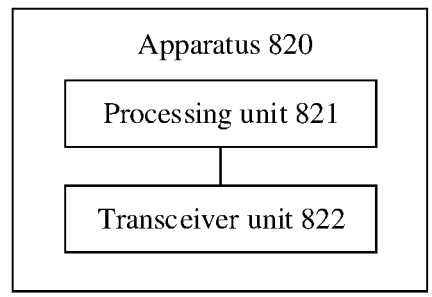
FIG. 18 is a schematic diagram 2 of a structure of an apparatus for controlling an Android app according to an embodiment of this application.

FIG. 18 is a schematic block diagram of an apparatus 820 for controlling an Android app according to an embodiment of this application. The apparatus 820 may be configured to perform actions performed by the Android simulator in the foregoing method embodiments. The apparatus 820 includes a processing unit 821.

The processing unit 821 is configured to install, start, or uninstall a target Android app according to a first instruction, where the first instruction is triggered when a user performs an installation operation, a starting operation, or an uninstallation operation on the target Android app on a terminal device running a Windows operating system, and the target Android app is an application applicable to an Android operating system.

When the Android simulator installs the target Android app, the Android simulator creates a shortcut of the target Android app on the terminal device.

Alternatively, when the Android simulator starts the target Android app, the Android simulator displays a running interface of the target Android app on a desktop of the terminal device.

Alternatively, when the Android simulator uninstalls the target Android app, the Android simulator deletes a shortcut of the target Android app from the terminal device.

According to this solution in this application, the Android simulator may create the shortcut for the Android app in a common control area of the Windows terminal device, so that the Android app can be conveniently controlled (for example, downloaded, started, uninstalled, or changed) on the Windows operating system. This is the same as a manner of performing an operation on Windows software on the Windows operating system, and conforms to a conventional operation habit of the Windows user. The user does not need to manually trigger the simulator to start, and does not need to perform an operation in a main window of the simulator to use the Android app. Therefore, this solution can improve user experience.

In some embodiments, the processing unit 821 is specifically configured to:
  in response to the first instruction, start the Android simulator in a background; and
  install, start, or uninstall the target Android app according to the first instruction.

In some embodiments, the processing unit 821 is specifically configured to:
  call a first application programming interface API of the Windows operating system, to create the shortcut of the target Android app on the terminal device, and trigger display of a shortcut icon of the target Android app on the terminal device.

In some embodiments, the processing unit 821 is specifically configured to:
  create the shortcut of the target Android app in a start menu of the terminal device; and/or
  create the shortcut of the target Android app on an uninstall or change program interface on a control panel of the terminal device; and/or
  create the shortcut of the target Android app on the desktop of the terminal device; and/or create the shortcut of the target Android app on an application function interface in settings of the terminal device.

In some embodiments, a file name corresponding to the shortcut icon includes a preset character and an application name of the target Android app, and the preset character may be a blank character or an invisible character.

In some embodiments, the first instruction is triggered when the user performs an installation operation on the target Android app by using an application market installed on the terminal device.

In this case, the processing unit 821 is specifically configured to:

receive, through interprocess communication, the first instruction sent by the application market, where the first instruction includes application name information and installation package storage path information of the target Android app;

obtain a first installation package of the target Android app based on the application name information of the target Android app and a shared path that is indicated by the installation package storage path information of the target Android app; and load the first installation package of the target Android app by using the Android system, to install the target Android app.

In some embodiments, the apparatus 820 further includes a transceiver unit 822.

The transceiver unit 822 is configured to: when the processing unit 821 installs the target Android app, obtain application information of the target Android app, where the application information of the target Android app includes a package name, an application icon, the application name, version information, landscape/portrait orientation information, installation time, and/or a name identifier that are/is corresponding to the target Android app.

The processing unit 821 is further configured to generate, on the terminal device based on the application information of the target Android app, a second installation package associated with the shortcut icon of the target Android app, where the second installation package includes the application name, application configuration information, a driver used to start the target Android app, and a driver used to uninstall/update the target Android app that are corresponding to the target Android app.

In some embodiments, the transceiver unit 822 is further configured to: after the processing unit 821 installs the target Android app according to the first instruction, send a first response message to the application market on the terminal device through interprocess communication, where the first response message includes the package name of the target Android app and a result indicating that the target Android app has been installed.

In some embodiments, the first instruction may be triggered when the user performs a starting operation on the shortcut icon of the target Android app on the terminal device, or may be triggered when the user performs a starting operation on a start control that is corresponding to the target Android app and that is in the application market on the terminal device.

The processing unit 821 is specifically configured to: when the processing unit 821 has installed the target Android app, in response to the first instruction, invoke a driver that is used to start the target Android app and that is in the second installation package associated with the shortcut icon of the target Android app, to trigger the Android system to start the target Android app.

The processing unit 821 is further specifically configured to: draw a first window for the target Android app on the desktop of the terminal device, and add the running interface of the target Android app to the first window by using the Android system.

In some embodiments, the drawing a first window for the target Android app on the desktop of the terminal device includes:

drawing the first window on the desktop of the terminal device based on the landscape/portrait orientation information corresponding to the target Android app.

In some embodiments, when the landscape/portrait orientation information indicates a landscape orientation, a horizontal size of the drawn first window is greater than a vertical size of the first window; or when the landscape/portrait orientation information indicates a portrait orientation, a vertical size of the drawn first window is greater than a horizontal size of the first window.

In some embodiments, the first instruction may be triggered when the user performs an uninstallation operation on the shortcut icon of the target Android app on the terminal device.

Correspondingly, the processing unit 821 is further specifically configured to: invoke, according to the first instruction, a driver that is used to uninstall the target Android app and that is in the second installation package corresponding to the target Android app, read the package name of the target Android app from the application configuration information of the second installation package, search to find the target Android app based on the package name of the target Android app, and uninstall the target Android app by using the Android system.

In some embodiments, the transceiver unit 822 is further configured to: after the target Android app is uninstalled, send a second response message to the application market on the terminal device through interprocess communication by using the Android simulator, where the second response message includes the package name of the target Android app and a result indicating that the target Android app has been uninstalled.

The apparatus 820 according to an embodiment of this application may correspondingly perform the methods described in embodiments of this application, and the foregoing and other operations and/or functions of the units in the apparatus 820 are used to implement corresponding procedures of the methods. For brevity, details are not described herein again.

Figure 19:
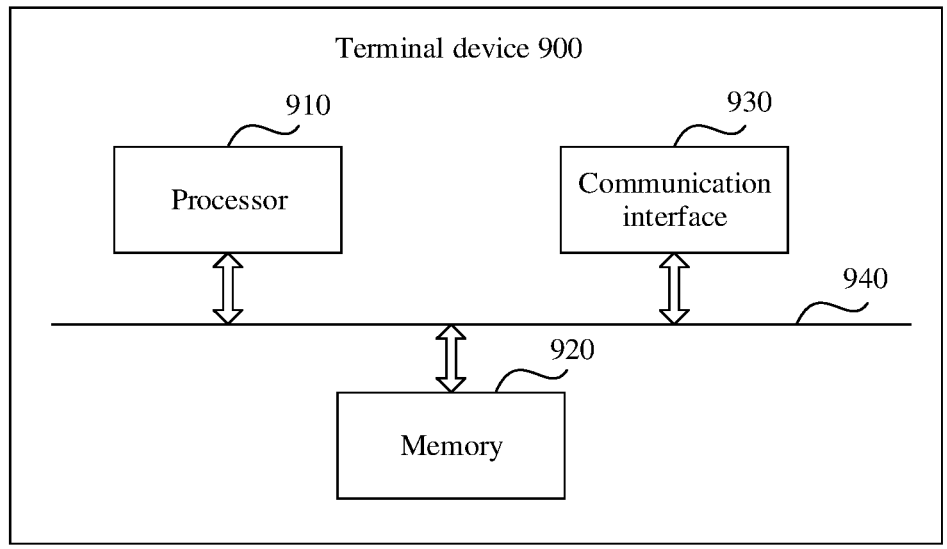
FIG. 19 is a schematic diagram of a structure of a terminal device according to an embodiment of this application.

FIG. 19 is a schematic diagram of a structure of a terminal device 900 according to an embodiment of this application. The terminal device 900 includes a processor 910, a memory 920, a communication interface 930, and a bus 940.

The processor 910 may be connected to the memory 920. The memory 920 may be configured to store program code and data. Therefore, the memory 920 may be a storage unit in the processor 910, an external storage unit independent of the processor 910, or a component including the storage unit in the processor 910 and the external storage unit independent of the processor 910. It should be noted that the processor 910 in the terminal device 900 shown in FIG. 19 may be corresponding to the processing unit 812 in the apparatus 810 in FIG. 17 or corresponding to the processing unit 821 in the apparatus 820 in FIG. 18.

Optionally, the terminal device 900 may further include the bus 940. The memory 920 and the communication interface 930 may be connected to the processor 910 through the bus 940. The bus 940 may be a peripheral component interconnect (peripheral component interconnect, PCI) bus, an extended industry standard architecture (extended industry standard architecture, EISA) bus, or the like. The bus 940 may be classified into an address bus, a data bus, a control bus, and the like. For ease of representation, the bus is represented by using only one line in FIG. 19, which, however, does not mean that there is only one bus or one type of bus.

It should be understood that in an embodiment of this application, the processor 910 may be a CPU. The processor may be alternatively another general purpose processor, a digital signal processor (digital signal processor, DSP), an application-specific integrated circuit (application-specific integrated circuit, ASIC), a field programmable gate array (field programmable gate array, FPGA), another programmable logic device, a discrete gate, a transistor logic device, a discrete hardware component, or the like. The general purpose processor may be a microprocessor, or the processor may be any conventional processor or the like. Alternatively, the processor 910 uses one or more integrated circuits to execute a related program, to implement the technical solutions provided in embodiments of this application.

The memory 920 may include a read-only memory and a random access memory, and provide instructions and data for the processor 910. A part of the processor 910 may further include a non-volatile random access memory. For example, the processor 910 may further store device type information.

When the terminal device 900 runs, the processor 910 executes computer executable instructions in the memory 920 to perform operation steps of the foregoing methods.

It should be understood that the terminal device 900 according to an embodiment of this application may be corresponding to the apparatus 810 or the apparatus 820 in embodiments of this application, and the foregoing and other operations and/or functions of the units in the apparatus 810 or the apparatus 820 are used to implement corresponding procedures of the methods. For brevity, details are not described herein again.

Optionally, in some embodiments, an embodiment of this application further provides a computer-readable medium. The computer-readable medium stores program code. When the computer program code is run on a computer, the computer is enabled to perform the methods in the foregoing aspects.

Optionally, in some embodiments, an embodiment of this application further provides a computer program product. The computer program product includes computer program code. When the computer program code is run on a computer, the computer is enabled to perform the methods in the foregoing aspects.

In embodiments of this application, the terminal device includes a hardware layer, an operating system layer running above the hardware layer, and an application layer running above the operating system layer. The hardware layer may include hardware such as a central processing unit (central processing unit, CPU), a memory management unit (memory management unit, MMU), and a memory (also referred to as a main memory). An operating system at the operating system layer may be any one or more computer operating systems that process a service by using a process (process), for example, a Linux operating system, a Unix operating system, an Android operating system, an iOS operating system, or a Windows operating system. The application layer may include applications such as a browser, an address book, word processing software, and instant messaging software.

Specific structures of execution bodies of the methods provided in embodiments of this application are not specifically limited in embodiments of this application, provided that a program that records code for performing the methods provided in embodiments of this application can be run to perform communication by using the methods provided in embodiments of this application. For example, the methods provided in embodiments of this application may be performed by the terminal device, a network device, or a functional module that is in the terminal device or a network device and that can invoke and execute the program.

Aspects or features of this application may be implemented as a method, an apparatus, or a product that uses standard programming and/or engineering technologies. A term "product" used in this specification may cover a computer program that can be accessed from any computer-readable component, carrier, or medium. For example, the computer-readable medium may include but is not limited to: a magnetic storage device (for example, a hard disk, a floppy disk, or a magnetic tape), an optical disc (for example, a compact disc (compact disc, CD) or a digital versatile disc (digital versatile disc, DVD)), a smart card, and a flash memory device (for example, an erasable programmable read-only memory (erasable programmable read-only memory, EPROM), a card, a stick, or a key drive).

Various storage media described in this specification may represent one or more devices and/or other machine-readable media that are configured to store information. A term "machine-readable media" may include but is not limited to a radio channel, and various other media that can store, contain, and/or carry instructions and/or data.

It should be understood that the processor mentioned in embodiments of this application may be a central processing unit (central processing unit, CPU), or may be another general purpose processor, a digital signal processor (digital signal processor, DSP), an application-specific integrated circuit (application-specific integrated circuit, ASIC), a field programmable gate array (field programmable gate array, FPGA), another programmable logic device, a discrete gate, a transistor logic device, a discrete hardware component, or the like. The general purpose processor may be a microprocessor, or the processor may be any conventional processor or the like.

It should also be understood that the memory mentioned in embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. By way of example rather than limitation, the RAM may include a plurality of forms as follows: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general purpose processor, a DSP, an ASIC, an FPGA, another programmable logic device, a discrete gate, a transistor logic device, or a discrete hardware component, the memory (storage module) may be integrated into the processor.

It should also be noted that the memories described in this specification are intended to include but are not limited to these memories and any other appropriate types of memories.

A person of ordinary skill in the art can be aware that, in combination with the examples described in embodiments disclosed in this specification, units and steps can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the protection scope of this application.

It can be clearly understood by a person skilled in the art that, for the purpose of convenient and brief description, for detailed working processes of the systems, apparatuses, and units described above, reference may be made to corresponding processes in the method embodiments. Details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division during actual implementation. For example, a plurality of units or components may be combined or may be integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected depending on an actual requirement to achieve the objectives of the solutions of embodiments.

In addition, functional units in embodiments of this application may be integrated into one unit, each of the units may exist alone physically, or at least two units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in embodiments of this application. The foregoing storage medium may include but is not limited to any medium that can store program code, like a USB flash drive, a removable hard disk, a ROM, a RAM, a magnetic disk, or an optical disc.

Unless otherwise defined, all technical and scientific terms used in this specification have same meanings as those usually understood by a person skilled in the art of this application. The terms used in this specification of this application are merely for the purpose of describing specific embodiments, and are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    running a Windows operating system;
    installing, starting, or uninstalling, by an Android simulator installed on a terminal device, a target Android application (app) in response to an installation, starting, or uninstallation operation performed by a user on the target Android app on the terminal device, wherein the target Android app is an application applicable to an Android operating system;
    performing at least one of the following steps:
        when the Android simulator installs the target Android app, displaying a shortcut icon of the target Android app on the terminal device;
        when the Android simulator starts the target Android app, displaying a running interface of the target Android app on a desktop of the terminal device; or
        when the Android simulator uninstalls the target Android app, deleting a shortcut icon of the target Android app from the terminal device;
    in response to the installation operation performed by the user on the target Android app on the terminal device, downloading a first installation package of the target Android app;
    storing the first installation package of the target Android app in a shared path in the terminal device;
    when the Android simulator installs the target Android app, obtaining, by the Android simulator, application information of the target Android app, wherein the application information of the target Android app comprises a package name, an application icon, or an application name; and
    generating, by the Android simulator on the terminal device based on the application information of the target Android app, a second installation package associated with the shortcut icon of the target Android app, wherein the second installation package comprises the application name corresponding to the target Android app, a first driver for starting the target Android app, and a second driver for uninstalling/updating the target Android app.

2. The method according to claim 1, wherein installing, starting, or uninstalling, by the Android simulator, the target Android app in response to the installation, starting, or uninstallation operation performed by the user on the target Android app on the terminal device comprises:
    in response to the installation, starting, or uninstallation operation performed by the user on the target Android app on the terminal device, starting the Android simulator in a background of the terminal device, and installing, starting, or uninstalling, by the Android simulator, the target Android app.

3. The method according to claim 1, wherein displaying the shortcut icon of the target Android app on the terminal device comprises:
calling, by the Android simulator, a first application programming interface (API) of the Windows operating system, to create the shortcut icon of the target Android app on the terminal device, and trigger display of the shortcut icon of the target Android app on the terminal device.

4. The method according to claim 3, wherein displaying the shortcut icon of the target Android app on the terminal device comprises:
displaying the shortcut icon of the target Android app in a start menu of the terminal device;
displaying the shortcut icon of the target Android app on an uninstall or change program interface on a control panel of the terminal device;
displaying the shortcut icon of the target Android app on the desktop of the terminal device; or
displaying the shortcut icon of the target Android app on an application function interface in settings of the terminal device.

5. The method according to claim 3, wherein a file name corresponding to the shortcut icon of the target Android app comprises a preset character and an application name of the target Android app.

6. The method according to 1, wherein downloading the first installation package of the target Android app comprises downloading the first installation package of the target Android app from an application market; and
in response to the installation operation performed by the user on the target Android app on the terminal device comprises in response to the installation operation performed by the user on an installation control that is corresponding to the target Android app and that is in the application market.

7. The method according to claim 6, wherein displaying the running interface of the target Android app on the desktop of the terminal device comprises:
in response to the application market being an exe file and being installed on the terminal device, when the exe file is launched, presenting a running interface of the application market on the terminal device; or
in response to the application market being an exe file and being associatively installed in an application market apk in the Android simulator, when an instruction of the user for running the exe file is received, launching the application market apk in the Android simulator and displaying a running interface of the application market on the terminal device.

8. The method according to claim 6, wherein installing, by the Android simulator, the target Android app comprises:
sending, by the application market, application name information and installation package storage path information of the target Android app to the Android simulator through interprocess communication;
obtaining, by the Android simulator, the first installation package of the target Android app based on the application name information of the target Android app and the shared path that is indicated by the installation package storage path information of the target Android app; and
loading, by the Android simulator, the first installation package of the target Android app using the Android operating system, to install the target Android app.

9. The method according to claim 6, wherein:
the application information of the target Android app further comprises version information, landscape/portrait orientation information, installation time, or a name identifier corresponding to the target Android app; and
the second installation package further comprises application configuration information corresponding to the target Android App.

10. The method according to claim 1, wherein after installing the target Android app, the method further comprises:
sending, by the Android simulator, a first response message to the application market on the terminal device through interprocess communication, wherein the first response message comprises a package name of the target Android app and a result indicating that the target Android app has been installed; and
updating, by the application market based on the first response message, the installation control that is corresponding to the target Android app and that is in the application market to a start control for display.

11. The method according to claim 10, wherein starting, by the Android simulator, the target Android app in response to a starting operation performed by the user on the target Android app on the terminal device comprises:
in response to the starting operation performed by the user on the shortcut icon of the target Android app, invoking, by the terminal device, a driver corresponding to starting the target Android app and that is in the second installation package associated with the shortcut icon of the target Android app, to trigger the Android simulator to enable an app starting function, reading the package name of the target Android app from application configuration information of the second installation package, and sending the package name of the target Android app to the Android simulator; and
searching the Android simulator to find the target Android app based on the package name of the target Android app, drawing, on the terminal device, a first window corresponding to the target Android app, starting, by the Android operating system, the target Android app, and placing the running interface of the target Android app into the first window.

12. The method according to claim 10, wherein uninstalling, by the Android simulator, the target Android app in response to the uninstallation operation performed by the user on the target Android app on the terminal device comprises:
in response to the uninstallation operation performed by the user on the shortcut icon of the target Android app on the terminal device, invoking, by the terminal device, a driver corresponding to uninstall the target Android app and that is in a second installation package corresponding to the target Android app, to trigger the Android simulator to enable an app uninstallation function, reading the package name of the target Android app from application configuration information of the second installation package, and sending the package name of the target Android app to the Android simulator; and
searching the Android simulator to find the target Android app based on the package name of the target Android app, and uninstalling the target Android app by using the Android operating system.

13. The method according to claim 12, wherein after uninstalling the target Android app, the method further comprises:
- sending, by the Android simulator, a second response message to the application market on the terminal device through interprocess communication, wherein the second response message comprises the package name of the target Android app and a result indicating that the target Android app has been uninstalled; and
- updating, by the application market based on the second response message, the start control corresponding to the target Android app to the installation control for display.

14. A terminal device, comprising one or more processors, wherein the one or more processors are coupled to a memory, and the one or more processors are configured to execute a computer program or instructions stored in the memory, so that the terminal device implements a method comprising:
- running a Windows operating system;
- installing, starting, or uninstalling, by an Android simulator installed on the terminal device, a target Android application (app) in response to an installation, starting, or uninstallation operation performed by a user on the target Android app on the terminal device, wherein the target Android app is an application applicable to an Android operating system;
- performing at least one of the following steps:
  - when the Android simulator installs the target Android app, displaying a shortcut icon of the target Android app on the terminal device;
  - when the Android simulator starts the target Android app, displaying a running interface of the target Android app on a desktop of the terminal device; or
  - when the Android simulator uninstalls the target Android app, deleting a shortcut icon of the target Android app from the terminal device;
- in response to the installation operation performed by the user on the target Android app on the terminal device, downloading a first installation package of the target Android app;
- storing the first installation package of the target Android app in a shared path in the terminal device;
- when the Android simulator installs the target Android app, obtaining, by the Android simulator, application information of the target Android app, wherein the application information of the target Android app comprises a package name, an application icon, or an application name; and
- generating, by the Android simulator on the terminal device based on the application information of the target Android app, a second installation package associated with the shortcut icon of the target Android app, wherein the second installation package comprises the application name corresponding to the target Android app, a first driver for starting the target Android app, and a second driver for uninstalling/updating the target Android app.

15. The terminal device according to claim 14, wherein installing, starting, or uninstalling, by the Android simulator, the target Android app in response to the installation, starting, or uninstallation operation performed by the user on the target Android app on the terminal device comprises:
- in response to the installation, starting, or uninstallation operation performed by the user on the target Android app on the terminal device, starting the Android simulator in a background of the terminal device, and installing, starting, or uninstalling, by the Android simulator, the target Android app.

16. The terminal device according to claim 14, wherein displaying the shortcut icon of the target Android app on the terminal device comprises:
- calling, by the Android simulator, a first application programming interface (API) of the Windows operating system, to create a shortcut icon of the target Android app on the terminal device, and trigger display of the shortcut icon of the target Android app on the terminal device.

17. The terminal device according to claim 16, wherein displaying the shortcut icon of the target Android app on the terminal device comprises:
- displaying the shortcut icon of the target Android app in a start menu of the terminal device;
- displaying the shortcut icon of the target Android app on an uninstall or change program interface on a control panel of the terminal device;
- displaying the shortcut icon of the target Android app on the desktop of the terminal device; or
- displaying the shortcut icon of the target Android app on an application function interface in settings of the terminal device.

18. The terminal device according to claim 16, wherein a file name corresponding to the shortcut icon of the target Android app comprises a preset character and an application name of the target Android app.

19. The terminal device according to claim 14, wherein the method further comprises:
- in response to the installation operation performed by the user on the target Android app on the terminal device, downloading a first installation package of the target Android app; and
- storing the first installation package of the target Android app in a shared path in the terminal device.

* * * * *

UNITED STATES PATENT AND TRADEMARK OFFICE
CERTIFICATE OF CORRECTION

| | | |
|---|---|---|
| PATENT NO. | : 12,468,518 B2 | Page 1 of 1 |
| APPLICATION NO. | : 18/557736 | |
| DATED | : November 11, 2025 | |
| INVENTOR(S) | : Liu et al. | |

It is certified that error appears in the above-identified patent and that said Letters Patent is hereby corrected as shown below:

In the Claims

In Column 37, in Claim 6, Line 29, delete "1," and insert -- claim 1, --.

Signed and Sealed this
Sixth Day of January, 2026

John A. Squires
*Director of the United States Patent and Trademark Office*